(12) United States Patent
Asai

(10) Patent No.: US 7,140,664 B2
(45) Date of Patent: Nov. 28, 2006

(54) VEHICLE SUN VISORS

(75) Inventor: Takashi Asai, Toyota (JP)

(73) Assignees: Kyowa Sangyo Co., Ltd., Aichi-ken (JP); Shinwa Seiko Co., Ltd., Aichi-ken (JP)

(*) Notice: Subject to any disclaimer, the term of this patent is extended or adjusted under 35 U.S.C. 154(b) by 0 days.

(21) Appl. No.: 11/113,711

(22) Filed: Apr. 25, 2005

(65) Prior Publication Data

US 2005/0236864 A1    Oct. 27, 2005

(30) Foreign Application Priority Data

Apr. 26, 2004  (JP) .............................. 2004-129612
May 26, 2004  (JP) .............................. 2004-155971

(51) Int. Cl.
*B60J 3/06*  (2006.01)

(52) U.S. Cl. ..................................... 296/97.8; 296/97.4

(58) Field of Classification Search ............... 296/97.1, 296/97.4, 97.8, 97.9, 97.11
See application file for complete search history.

(56) References Cited

U.S. PATENT DOCUMENTS 5,031,952 A * 7/1991 Miyamoto et al. ......... 296/97.4
5,529,367 A * 6/1996 Van Order et al. ......... 296/97.11

FOREIGN PATENT DOCUMENTS

JP    58-19813     2/1983
JP    62-197422    9/1987

\* cited by examiner

*Primary Examiner*—Joseph D. Pape
(74) *Attorney, Agent, or Firm*—Conley Rose, P.C.

(57) ABSTRACT

A vehicle sun visor includes a visor body and a fixed base mounted within a storage space defined in a vehicle cabin ceiling. A linearly movable member is movable along a first guide rail. A movable support member is movable along a second guide rail and is pivotally coupled to the linearly movable member. The visor body is movable between a storage position and a first light shielding position along the windshield. In addition, the visor support may include a support member and a guide device. The guide device allows the visor body to move along a predetermined path between a first light shielding position and a second light shielding position along a side window, while one side of the visor body faces the interior of a vehicle cabin.

20 Claims, 27 Drawing Sheets

VEHICLE SUN VISORS

This application claims priority to Japanese patent application serial numbers 2004-129612 and 2004-155971, the contents of which are incorporated herein by reference.

BACKGROUND OF THE INVENTION

1. Field of the Invention

The present invention relates to vehicle sun visors adapted to be mounted to a vehicle cabin ceiling.

2. Description of the Related Art

In general, a vehicle sun visor has a visor body pivotally supported by a horizontal rod portion of a support rod that is mounted to a vehicle cabin ceiling. The visor body is able to move between a storage position adjacent to the vehicle cabin ceiling and a light shielding position adjacent to the front windshield as the visor body pivots about the axis of the horizontal rod portion of the support rod.

Japanese Laid-Open Utility Model Publication No. 62-197422 teaches a vehicle sun visor that has a support device enabling a visor body to move into and be withdrawn from a storage space defined within the vehicle cabin ceiling. The visor body can pivot about a horizontal rod when the visor body has reached the end or limit of the withdrawing movement (i.e., a fully withdrawn position).

Therefore, according to the arrangement of this publication, the appearance of the vehicle cabin ceiling will not be degraded by the constant exposure of the visor body, since the visor body can be concealed within the storage space of the vehicle cabin ceiling when the visor body is in a storage position.

However, in order to move the visor body to a desired light shielding position, it is necessary to initially fully withdraw the visor body to the end of the withdrawal stroke. Then, the visor body can pivot to a desired angular position about the horizontal rod portion. Therefore, the resulting operation is relatively cumbersome and somewhat troublesome. In addition, it is difficult to motorize the visor body in order to enable an automatic movement of the visor body.

Further, a sun visor is also known that has a visor body movable between a front light shielding position adjacent to a front windshield, and a side light shielding position adjacent to a side window, in addition to being moveable between a storage position adjacent to a vehicle cabin ceiling and the front light shielding position. To this end, a substantially L-shaped support rod having a horizontal rod portion and a vertical rod portion is rotatably mounted to the vehicle cabin ceiling. More specifically, the vertical rod portion is rotatably mounted to a boss portion of a bracket that is fixed to the vehicle cabin ceiling. The visor body is rotatably mounted to the horizontal rod portion. Therefore, the visor body can move between the front light shielding position and the storage position as the visor body pivots about the axis of the horizontal rod portion. In addition, the visor body can move between the front light shielding position and the side light shielding position as the visor body pivots about the axis of the vertical rod portion.

During the movement of the visor body from the front light shielding position to the side light shielding position, an end of the visor body positioned furthest from the vertical pivotal axis moves along a circular path about the vertical pivotal axis. The circular path has a radius substantially corresponding to the horizontal length of the visor body. Therefore, the driver and/or the passenger must typically move himself or herself out of the circular path of the visor body during such movement of the visor body. Therefore, the operation of the visor body interferes with the driver and/or passenger and is troublesome in this respect.

Japanese Laid-Open Utility Model Publication No. 58-19813 teaches a sun visor that is configured to substantially reduce the path of movement of the visor body from a front light shielding position to a side light shielding position. The radius of movement is approximately half of the radius in comparison with the previously described circular path. As shown in FIG. 27, according to the sun visor of this publication the end of a horizontal rod portion 101 of an L-shaped support rod 100, located away from the vertical rod portion 100a, is bent substantially vertically downward to form a vertical bent portion 102. The vertical bent portion 102 is rotatably inserted into a hinge member 105. The hinge member 105 has a horizontal extension 106 to which a central portion (with respect to the horizontal direction) of a visor body 110 is pivotally mounted.

However, according to this configuration of the above publication as the visor body 110 is pivoted from a front light shielding position to a side light shielding position, the visor body 110 pivots in one direction about the vertical rod portion 100a of the support rod 100. The visor body 110 is also simultaneously pivoted in an opposite direction about the vertical bent portion 102 located at the other end of the horizontal rod portion 101 of the support rod 100. Therefore, the complex pivotal movement of the visor body 110 tends to become unstable, resulting in relative degradation of the operability of the sun visor.

SUMMARY OF THE INVENTION

It is accordingly an object of the present invention to teach vehicle sun visors that are improved in overall operability.

In one aspect of the present teachings, vehicle sun visors are taught that include a visor body and a fixed base mounted within a storage space defined within a vehicle cabin ceiling. A first guide rail may be provided in the fixed base. The first guide rail may extend linearly in a forward and rearward direction. A second guide rail may be provided on the fixed base, including a first rail portion extending linearly in a direction substantially parallel to the surface of the fixed base. The second guide rail may also include a second rail portion continuously formed in series with the first guide rail and extending along a curved path. A linearly movable member may be movable along the first guide rail. A movable support member may be movable along the second guide rail and may be coupled to the linearly movable member so as to pivot about an axis substantially perpendicular to the first guide rail. The visor base is mounted to the movable support member. The angular orientation of the visor body gradually changes from a first position corresponding to a storage position within the storage space, to a second position corresponding a light shielding position, as the movable support member moves along the second guide rail from the first rail portion through the second rail portion. For example, the visor body in the first position and the second position respectively extends substantially horizontally and substantially vertically. More specifically for example, the visor body in the first position extends along the surface of the vehicle cabin and the visor body in the second position extends along the vehicle windshield.

With this construction, as the linearly movable member moves along the first guide rail the movable support member and the visor body, pivotally mounted to the linearly movable member, may move linearly together. This allows the visor body to move from a storage position toward a light shielding position along the linear first rail portion of the second guide rail. As the visor body continues to move further toward the light shielding position, after the visor body has moved together with the movable support member through a predetermined distance, the movable support member may begin to pivot about a horizontal axis and is guided along the curved second rail portion of the second guide rail. As a result, the angular orientation of the visor body may be changed to a more suitable position for light shielding. Therefore, the operability of the visor body may be improved.

In one embodiment, the fixed base has a base plate including right and left side walls formed integrally with the base plate and respectively disposed for example, on the right and left sides of the base plate. The right and left side walls are located on the same surface of the base plate. The first guide rail is provided on the base plate. The second guide rail is provided on each of the right and left side walls. The right and left side walls extend substantially parallel to one another at least along the portions containing the second guide rails. Consequently, the first guide rail and the second guide rail may be relatively easily provided on the fixed base. In addition, the movable support member and eventually the visor body can be stably guided by the second guide rails provided on the right and left side walls.

In another embodiment, the sun visors further include a drive device having an electric motor as a drive source. The drive device is coupled to the linearly movable member. The linearly movable member is moved forward and rearward along the first guide rail by the drive device. With this arrangement, the sun visors can be easily motorized for automatic movement.

In another aspect of the present teachings, vehicle sun visors are taught that include a visor body and a visor support for supporting the visor body. The visor support has a support member and a guide device provided between the support member and the visor body. The guide device provides guidance for the movement of the visor body along a predetermined path between a first light shielding position along a windshield, and a second light shielding position along one of side windows, while one side surface of the visor body faces the interior of a vehicle cabin (i.e., a driver or passenger is typically exposed to only one side surface of the visor body during this movement).

With this arrangement, the visor body can reliably and stably move from the first light shielding position to the second light shielding position under the guidance of the guide device. The operation for changing the position of the visor body between the first light shielding position and the second light shielding position can therefore be readily performed.

In one embodiment, the visor body and the support member each have a longitudinal direction. The guide device has a slide support and a link arm. The slide support holds one end of the visor body in the longitudinal direction relative to the support member. The one end of the sun visor body is permitted to slide in the longitudinal direction of the support member via the slide support. The link arm has a first end pivotally supported by the movable support member via a vertical arm shaft. The link arm also has a second end opposite to the first end and pivotally connected to a substantially central portion (with respect to the longitudinal direction) of the visor body. The slide support moves along the support member as the link arm pivots about the axis of the vertical arm shaft. With this arrangement, the guide device may be configured to have a relatively simple construction via the primary elements of the slide support and the link arm.

In another embodiment, the sun visors further include a first drive device and a second drive device, each including an electric motor as a drive source. The first drive device moves the support member so as to move the visor body between a first light shielding position and a storage position along a vehicle cabin ceiling. The second drive device moves one of the link arm or the slide support.

With this arrangement, the movement of the visor body between a storage position and the first light shielding position can be motorized by the first drive device. In addition, the second drive device can motorize the movement of the visor body between the first light shielding position and the second light shielding position.

In a further embodiment, the motor of each of the first and second drive devices is fixed in position relative to the vehicle cabin ceiling. The one of the link arm or the slide support may be disconnected from the second drive device when the visor body is in a storage position. The one of the link arm or the slide support is connected to the second drive device in order to be driven by the second drive device when the visor body is in the first light shielding position.

Because the motors of the first and second drive devices are fixed in position relative to the vehicle cabin ceiling, the electrical wiring may be easily configured between these drive devices and a power source. Since the second drive device is not mounted to the movable support, it is not necessary to ensure adequate space around the movable support in order to position the second drive device. In addition, it is not necessary to establish troublesome electric wiring able to remain attached to a second drive device mounted to the movable support.

DETAILED DESCRIPTION OF THE INVENTION

Each of the additional features and teachings disclosed above and below may be utilized separately or in conjunction with other features and teachings to provide improved vehicle sun visors and methods of manufacturing such sun visors. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

(First Representative Embodiment)

Figure 1:
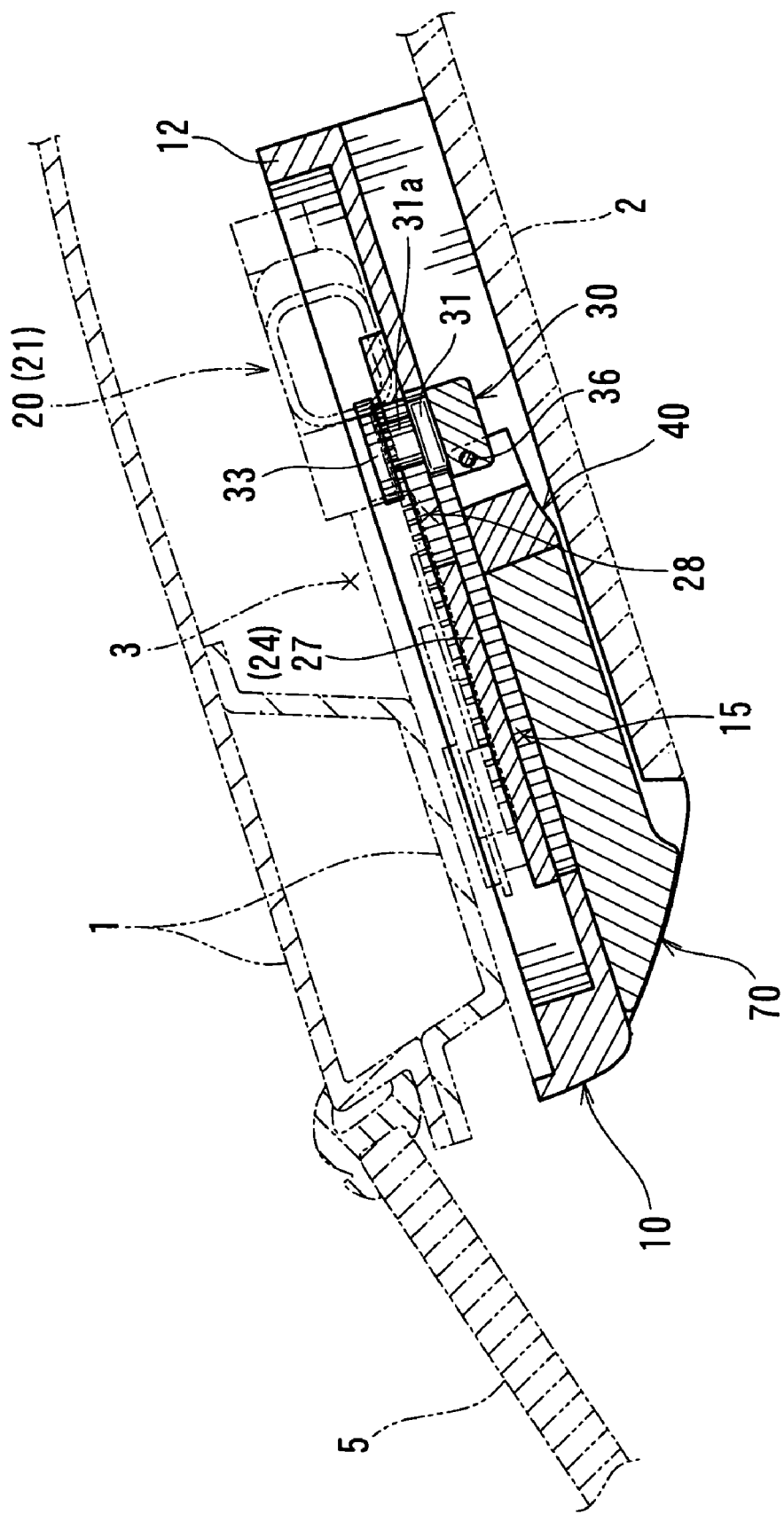
FIG. 1 is a cross-sectional view from the right side of a sun visor according to a first representative embodiment and showing the visor body stored within a storage space defined within the ceiling of a vehicle cabin.
Figure 2:
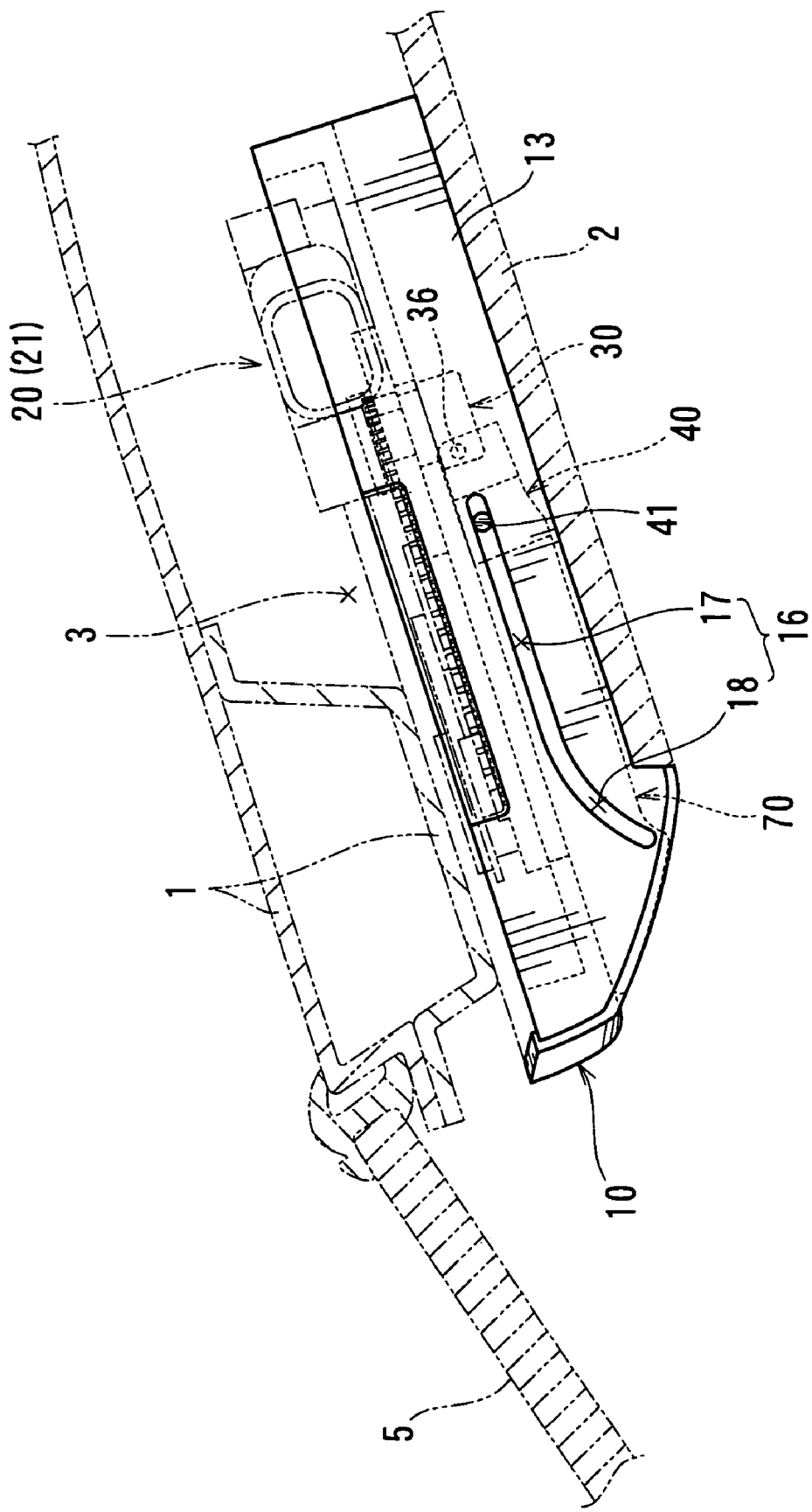
FIG. 2 is right side view of the sun visor shown in FIG. 1.

A first representative embodiment of the present invention will now be described with reference to FIGS. 1 to 8. Referring to FIGS. 1 and 2, a storage space 3 is defined between a roof panel 1 and a roof lining 2 that constitute a vehicle cabin ceiling. A front end (i.e., the left end as viewed in FIG. 1) of the roof lining 2 is configured with an opening communicating with the storage space 3. A sun visor is disposed within the storage space 3 and is unitized as an assembly of a linearly movable member 30, a movable support 40, a visor body 70, and a drive device 20, which are mounted to a fixed base 10. The drive device 20 has an electric motor 21 as the drive source.

Figure 3:
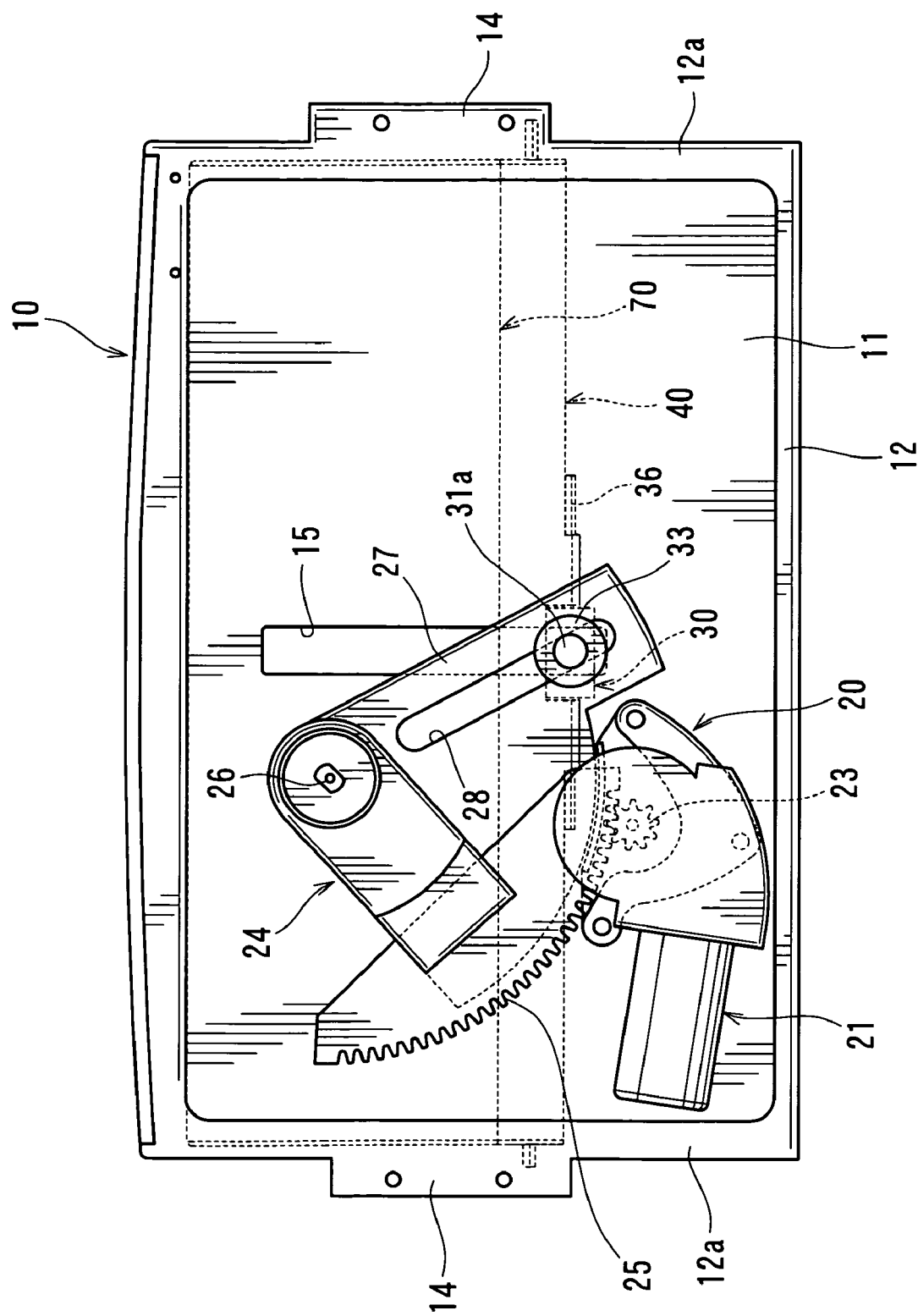
FIG. 3 is a plan view of the sun visor shown in FIG. 1 and showing the relationship between a fixed base and a drive device with an electric motor as a drive source.

As shown in FIGS. 3 to 6, the fixed base 10 has a substantially rectangular base plate 11, a circumferential wall 12 protruding upward (as viewed in FIG. 1) from the circumference of the base plate 11, and a right and left side wall 13 respectively protruding downward from the right and left ends of the base plate 11, as viewed in FIG. 3. The base plate 11, the circumferential wall 12, and the side walls 13, are integrally formed with each other. The side walls 13 may be continuously formed with the circumferential wall 12.

Mounting tabs 14 respectively extend in the right and left directions from upper edges of the right and left wall portions 12a of the circumferential wall 12. The fixed base 10 may be secured to the lower surface of the roof panel 1 at the mounting tabs 14 via screws (not shown) for example. The mount tabs 14 may also be directly secured to the roof panel 1 or may be secured to the roof panel via a suitable bracket.

As shown in FIG. 3, a linear rail 15 is formed in a substantially central position with respect to right and left directions. The linear rail 15 is configured as a rectangular slot elongated in forward and rearward directions (i.e., the upper and lower directions or vertically as viewed in FIG. 3). The linearly movable member 30 is disposed below the base plate 11 as seen in FIG. 1. The linearly movable member 30 has a square column-like shaft portion 31 that is inserted into the linear rail 15. The shaft portion 31 is movable in the forward and rearward directions along the linear rail 15 but the shaft portion 31 is prevented from rotating relative to the linear rail 15.

The movable support member 40 is disposed below the base plate 11 of the fixed base 10. The movable support member 40 is pivotally joined to the linearly movable member 30 via horizontal rods 36 extending horizontally from the sides of the linearly movable member 30. The visor body 70 is joined to the front end (i.e., the upper end as viewed in FIG. 3) of the movable support member 40. The visor body 70 can move in the forward and rearward directions together with the movable support member 40.

The movable support member 40 and the visor body 70 each have a width in the right and left directions, as viewed in FIG. 3, which is substantially the same as or slightly smaller than the distance between opposing surfaces of the right and left side walls 13 of the fixed base 10.

Figure 6:
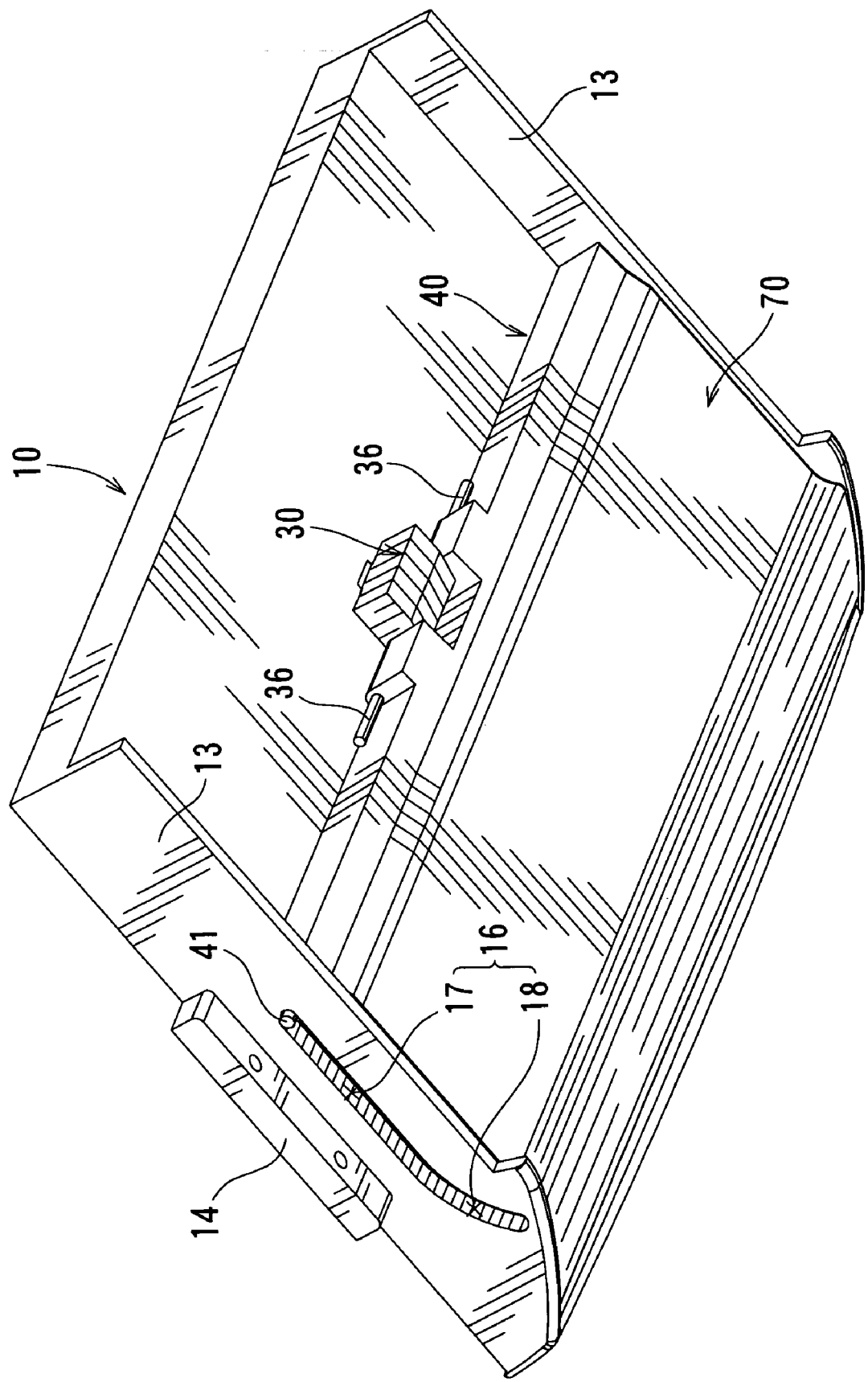
FIG. 6 is a perspective view of the sun visor showing the linearly movable member, movable support member, and the visor body disposed below the fixed base.

Referring to FIG. 6, guide rails 16 (only one guide rail 16 is seen in FIG. 6) configured as elongated slots are formed in the right and left side walls 13 of the fixed base 10 and are configured to be symmetrical with each other. The guide rails 16 provide a guide for the forward and rearward movement of the movable support member 40, and consequently the forward and rearward movement of the visor body 70. To this end, two pins 41 respectively extend from the right and left ends of the movable support member 40. The pins 41 are slidably fitted into respective guide rails 16 so that the pins 41 can move along the respective guide rails 16.

Each guide rail 16 has a linear guide portion 17 and a curved guide portion 18. The linear guide portion 17 extends substantially parallel to the surface of the base plate 11. The curved guide portion 18 is formed in series with the front end (i.e., the left end as viewed in FIG. 6) of the linear guide portion 17 and is curved downward towards a closed terminal end. The curved guide portion 18 may have a configuration, such as an arc-shape for example, or any other type of angled or curved configuration, such that the angular position of the visor body 70 (and the movable support portion 40) is gradually changed from a substantially horizontal position (i.e., a storage position) to a substantially vertical position (i.e., a light shielding position) as the pins 41 move from the linear guide portions 17 to the terminal ends of the curved guide portions 18.

Figure 4:
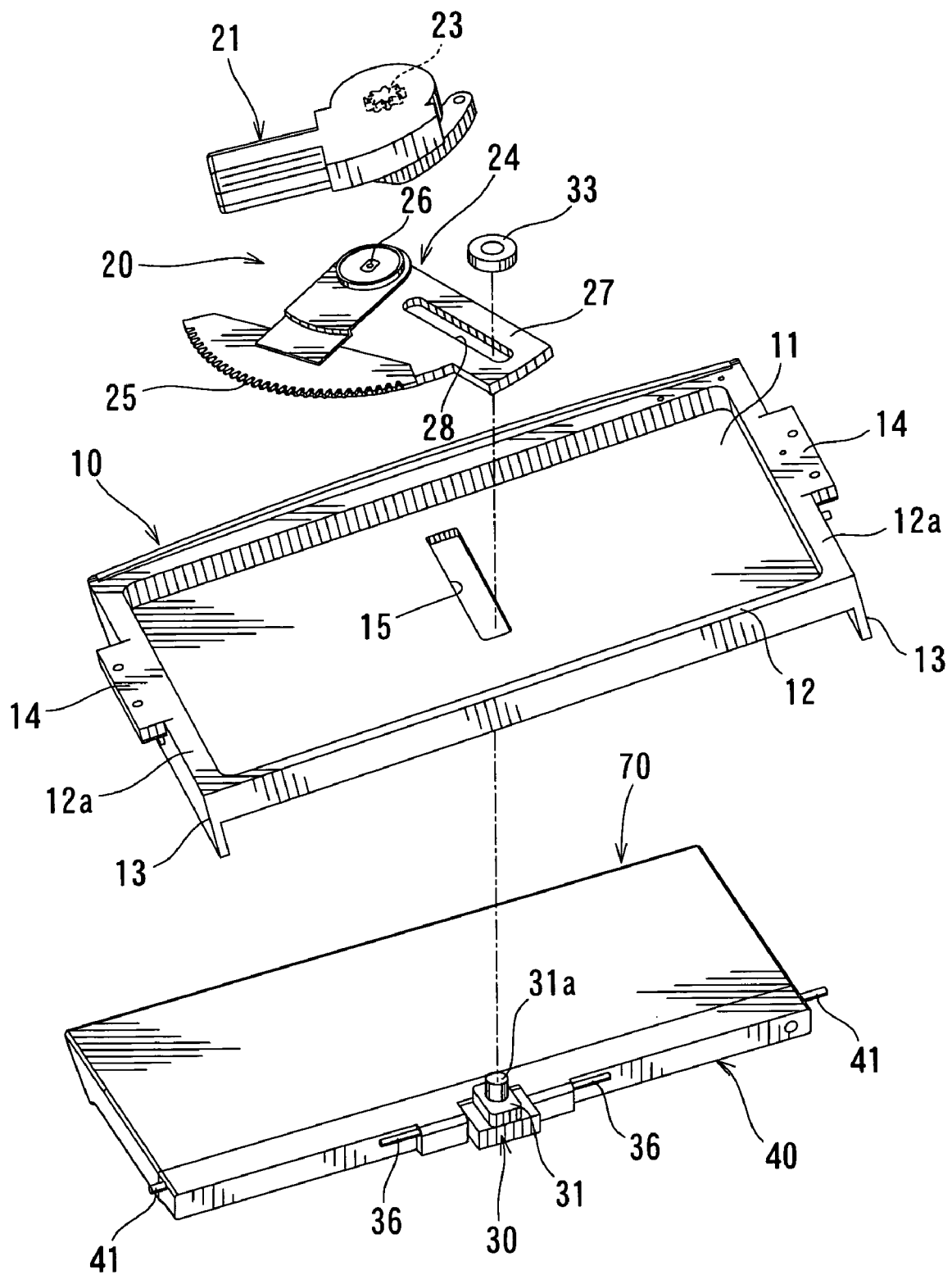
FIG. 4 is an exploded perspective view of the sun visor shown in FIG. 1 and showing in separated form a linearly movable device, a movable support member in addition to the fixed base, the drive device, and the visor body.
Figure 5:
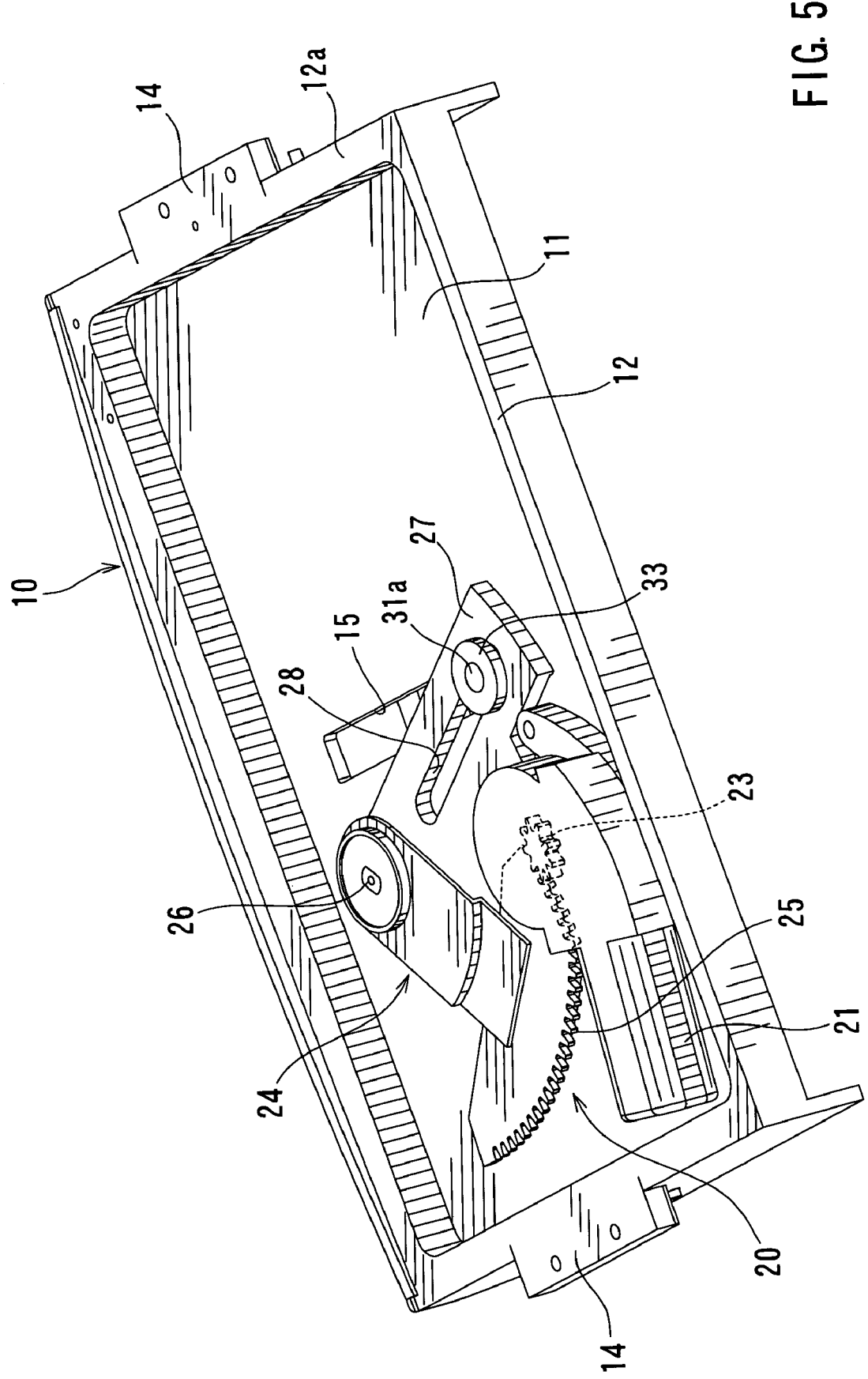
FIG. 5 is a perspective view of the sun visor and showing the drive device mounted to the upper surface of the fixed base.

In this first representative embodiment, the visor body 70 is moved out of and into the storage space 3 by the drive device 20. As shown in FIGS. 3 to 5, the drive device 20 includes the electric motor 21 as a drive source. The drive device 20 is disposed on the upper surface of the base plate 11 surrounded by the circumferential wall 12 of the fixed base 10. The electric motor 21 is a reversible motor and may include a reduction gear mechanism (not shown). The drive device 20 has an output gear or a drive gear 23 (e.g., pinion). An actuation member 24 includes a sector gear 25 integrally formed with the actuation member 24. The actuation member 24 may have a rotary shaft 26 that is rotatably mounted to the upper surface of the base plate 11. The sector gear 25 is in engagement with the drive gear 23.

In addition, a link arm 27 is integrally formed with the actuation member 24 and extends towards the linear rail 15. An elongated slot 28 is formed in the link arm 27 and extends along the longitudinal direction of the link arm 27. The shaft portion 31 of the linearly movable member 30 has a connecting pin 31a that is integrally formed with the upper end surface of the shaft portion 30. The connecting pin 31 extends into and slidably engages with the elongated slot 28 formed in the link arm 27. A nut 33 is threadably engaged with an upper portion of the connecting pin 31 in order to prevent the accidental or unintentional removal of the connecting pin 31 from the elongated slot 28.

A switch (not shown) may be provided for controlling the electric motor 21. The driver or the passenger can operate the switch in order to drive the electric motor 21 in a forward or a reverse direction, or to stop the electric motor 21. The linear guide member 30 can consequently be moved forward or rearward along the linear rail 15 by the operation of the switch. Preferably, the switch is mounted to a suitable position of the vehicle, such as an instrumental panel, any one or both of the side doors, or the roof lining 2, in order to easily enable the driver or the passenger to operate the switch.

The operation of the above first representative embodiment will now be described. In order to advance the visor body 70 from the storage position, where the visor body 70 is stored within the storage space 3 as shown in FIGS. 1 and 2, to a light shielding position, where the visor body 70 is positioned to oppose the windshield 5 and is substantially vertically inclined along the windshield 5, the driver or the passenger may operate the switch so as to rotate the electric motor 21 in the forward direction. The drive gear 23 may then rotate in one direction so that the sector gear 25, engaged with the drive gear 23, correspondingly rotates to pivot the actuation member 24 in a counterclockwise direction (as seen in FIG. 3) about the rotary shaft 26.

The actuation member 24 and the linearly movable member 30, which is guided to move in the forward and rearward directions along the linear rail 15, are slidably coupled to each other via the elongated slot 28 and the connecting pin 31a. Therefore, the pivotal movement of the actuation member 24 is converted into linear movement of the linearly movable member 30, subsequently advancing the linearly movable member 30 along the linear rail 15.

Figure 7:
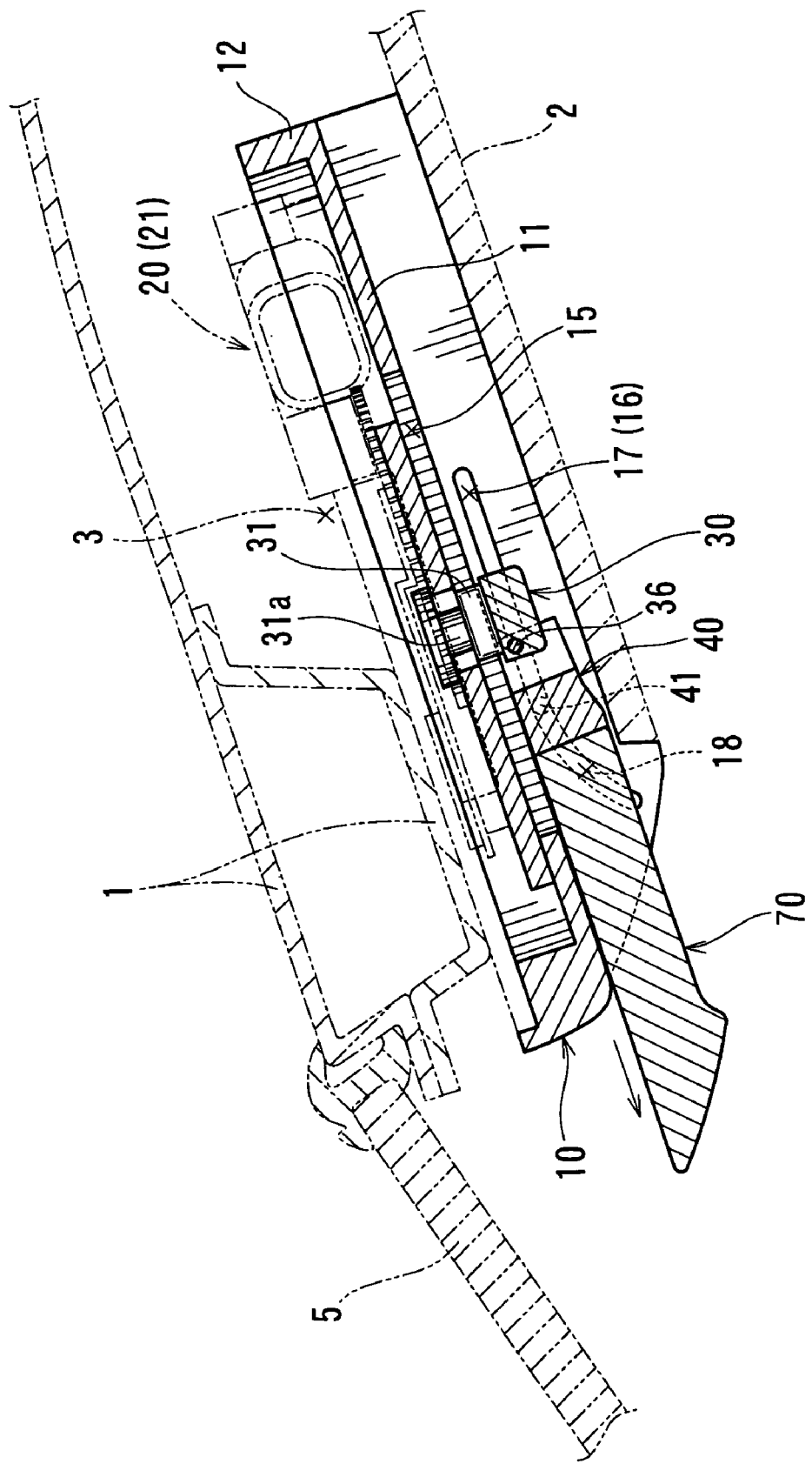
FIG. 7 is a cross-sectional view similar to FIG. 1 but showing the visor body advanced together with the movable support member to a position corresponding to a terminal end of a linear guide portion of a guide rail formed on the fixed base.

As the linearly movable member 30 advances, the visor body 70 moves linearly together with the movable support member 40 (i.e., via the horizontal rods 36) along the linear guide portions 17 as shown in FIG. 7. As the linearly movable member 30 further advances beyond the front end of the linear guide portion 17 together with the visor body 70 and the movable support member 40, the visor body 70 moves along the curved guide portion 18 while the movable support member 40 pivots about the horizontal rods 36.

Figure 8:
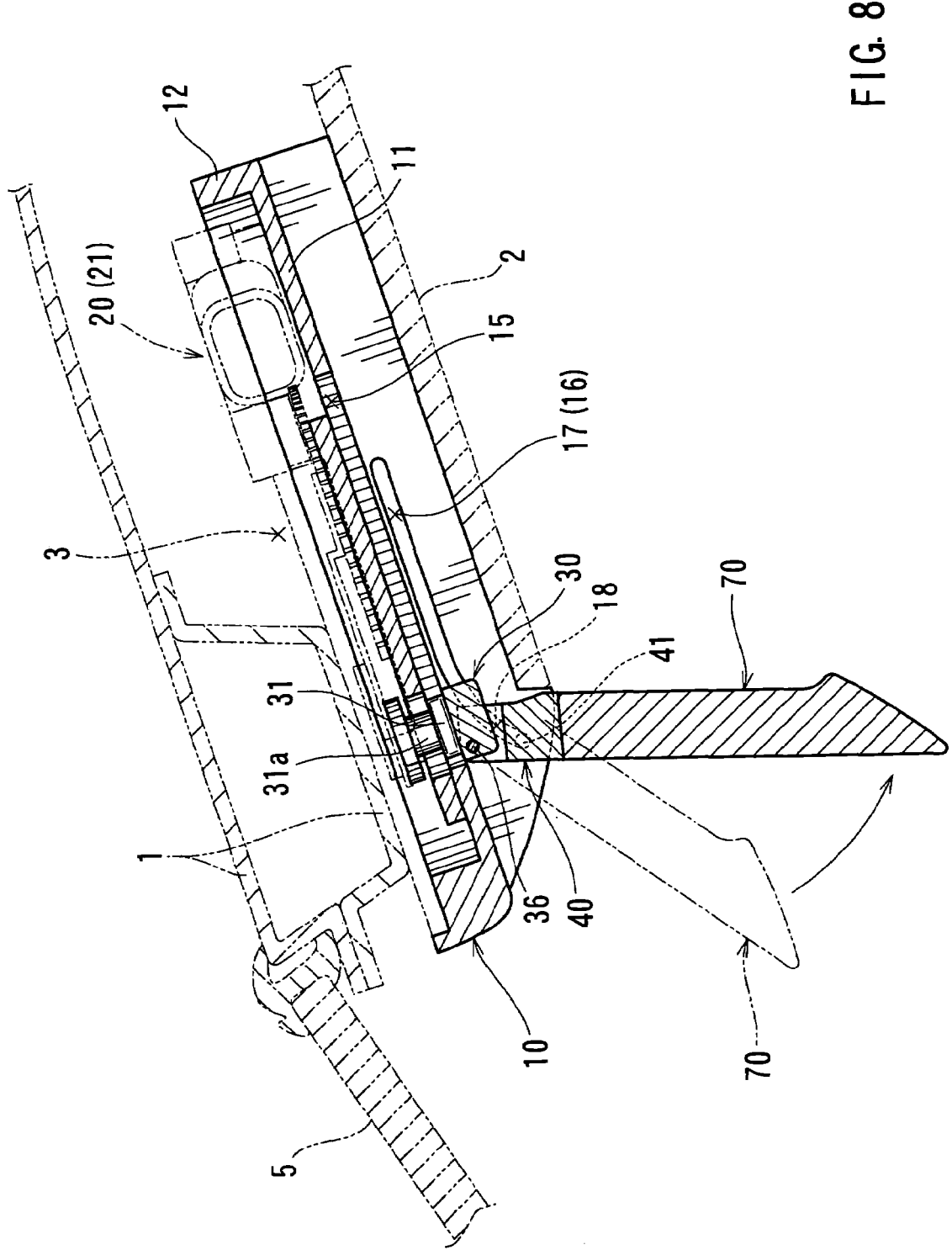
FIG. 8 is a cross-sectional view similar to FIG. 1 but showing the visor body advanced together with the movable support member to a position corresponding to a terminal end of a curved guide portion of the guide rail.

As a result, the angular position of the visor body 70 may gradually change from a substantially horizontal position (i.e., the storage position) towards a substantially vertical position (i.e., the light shielding position), as shown in FIG. 8. When the visor body 70 has reached the desired light shielding position, for example such as a vertical position or a position inclined by a suitable angle relative to the vertical direction, the operator may operate the switch so as to stop the electric motor 21 (e.g., by releasing the switch for example). The visor body 70 may then be held in the desired light shielding position.

On the contrary, in order to withdrawal the visor body 70 from a light shielding position to a storage position, the operator may operate the switch so as to rotate the electric motor 21 in the reverse direction. Therefore, the visor body 70 moves in an opposite manner to the manner described above so that the visor body 70 may be retracted and stored within the storage space 3.

As described above, according to the first representative embodiment, in order to move the visor body 70 the linearly movable member 30 may be moved by the drive device 20 having the electric motor 21. Therefore, the motorization or automation of the visor body 70 can be easily obtained.

In addition, according to the first representative embodiment, the linear rail 15 can be easily provided in the fixed base 10 by forming a slot in the base plate 11. Similarly, the guide rails 16 can also be easily provided in the fixed base 10 by forming slots in the right and left side walls 13.

Further, together with the movable support member 40, the visor body 70 can be stably guided by the guide rails 16 since the guide rails 16 are positioned on the right and left sides of the movable support member 40.

Although the first representative embodiment has been described, the present invention may not be limited to the first representative embodiment. Thus, the first representative embodiment may be modified without departing from the subject matter of the present invention. For example, although the linearly movable member 30 is moved forward and rearward by a drive device 20 having the electric motor 21 as a drive source in order to move the visor body 70 into and out of the storage space 3, the sun visor 70 may be moved by the manual operation of the driver or the passenger. This example will be hereinafter described as a second representative embodiment with reference to FIGS. 9 and 10.

(Second Representative Embodiment)

Figure 9:
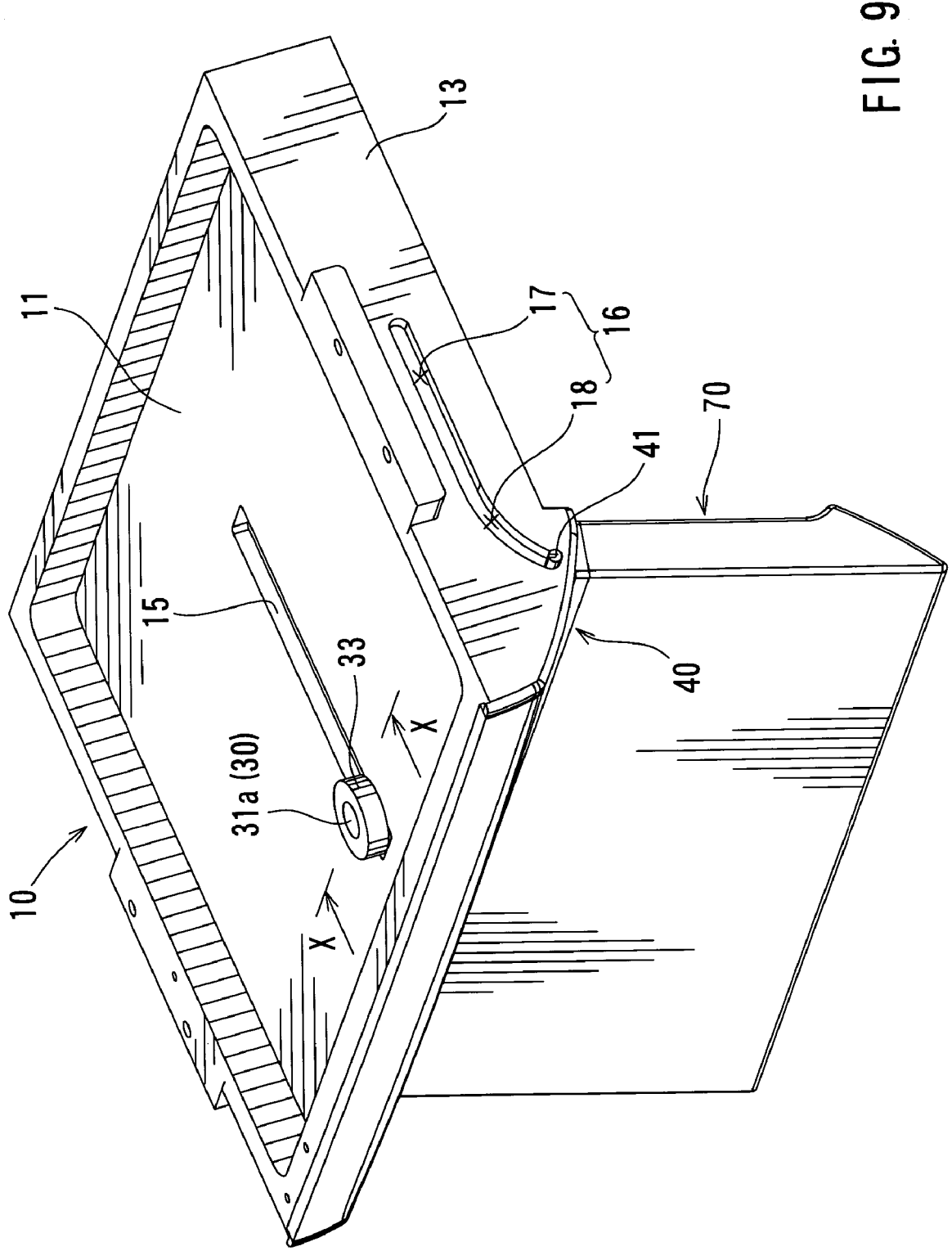
FIG. 9 is a perspective view of a sun visor according to a second representative embodiment that enables a visor body to be manually moved into and out of the storage space.
Figure 10:
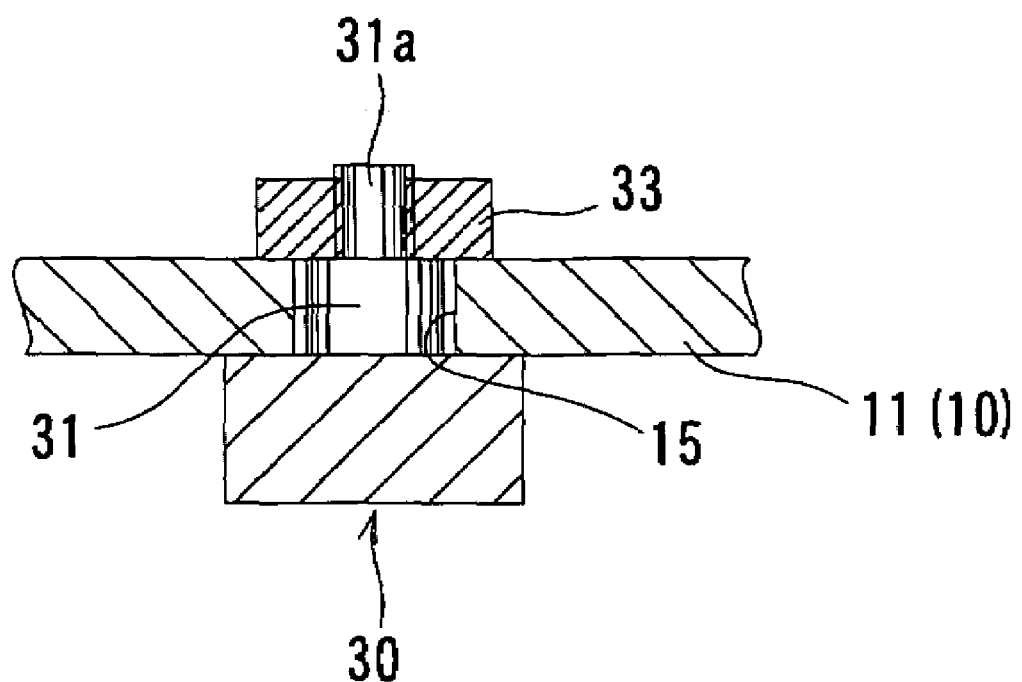
FIG. 10 is a partial cross-sectional view taken along line X—X in FIG. 9.
Figure 11:
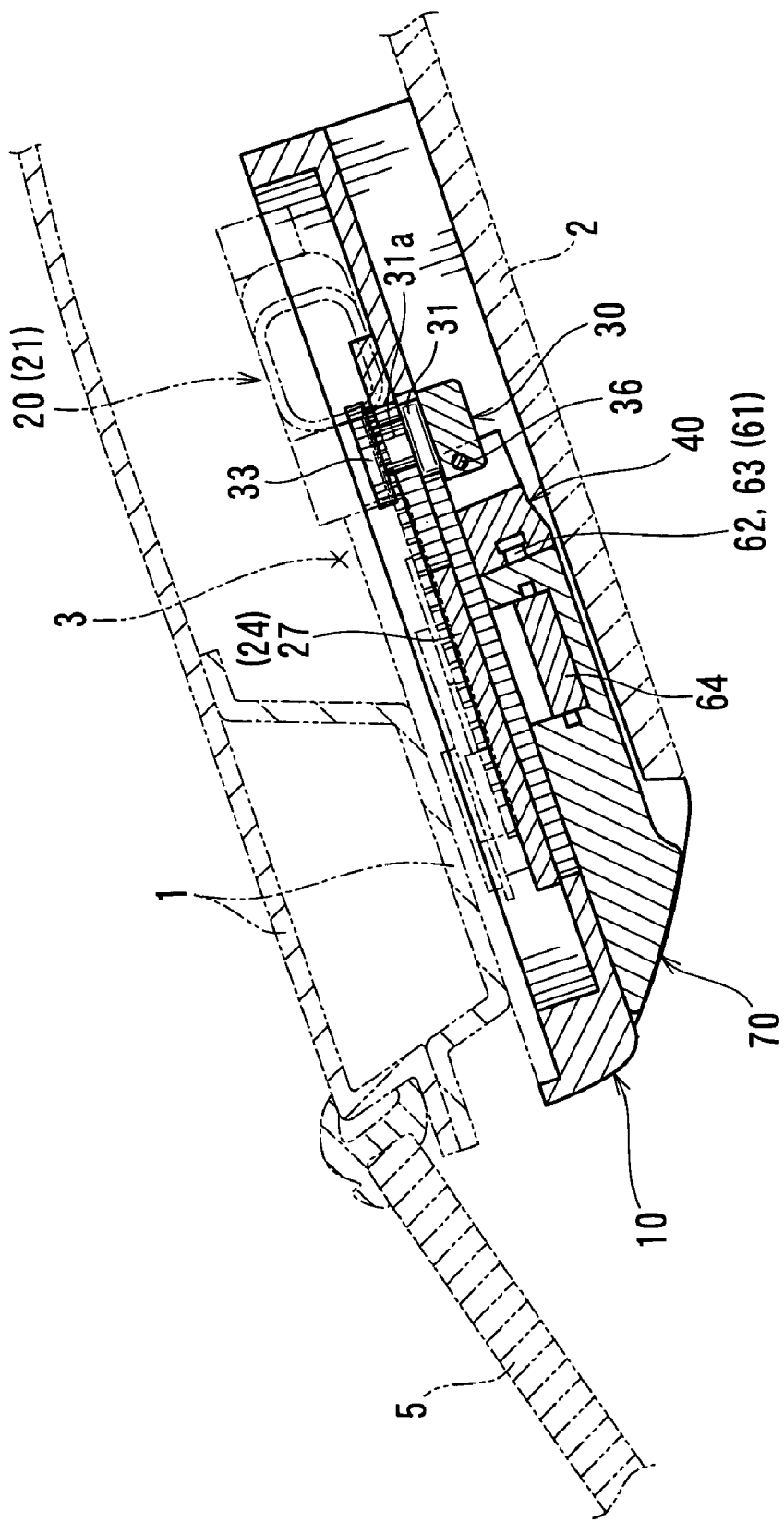
FIG. 11 is a cross-sectional view from the right side of a sun visor according to a third representative embodiment and showing a visor body stored within a storage space defined within a ceiling of a vehicle cabin.
Figure 12:
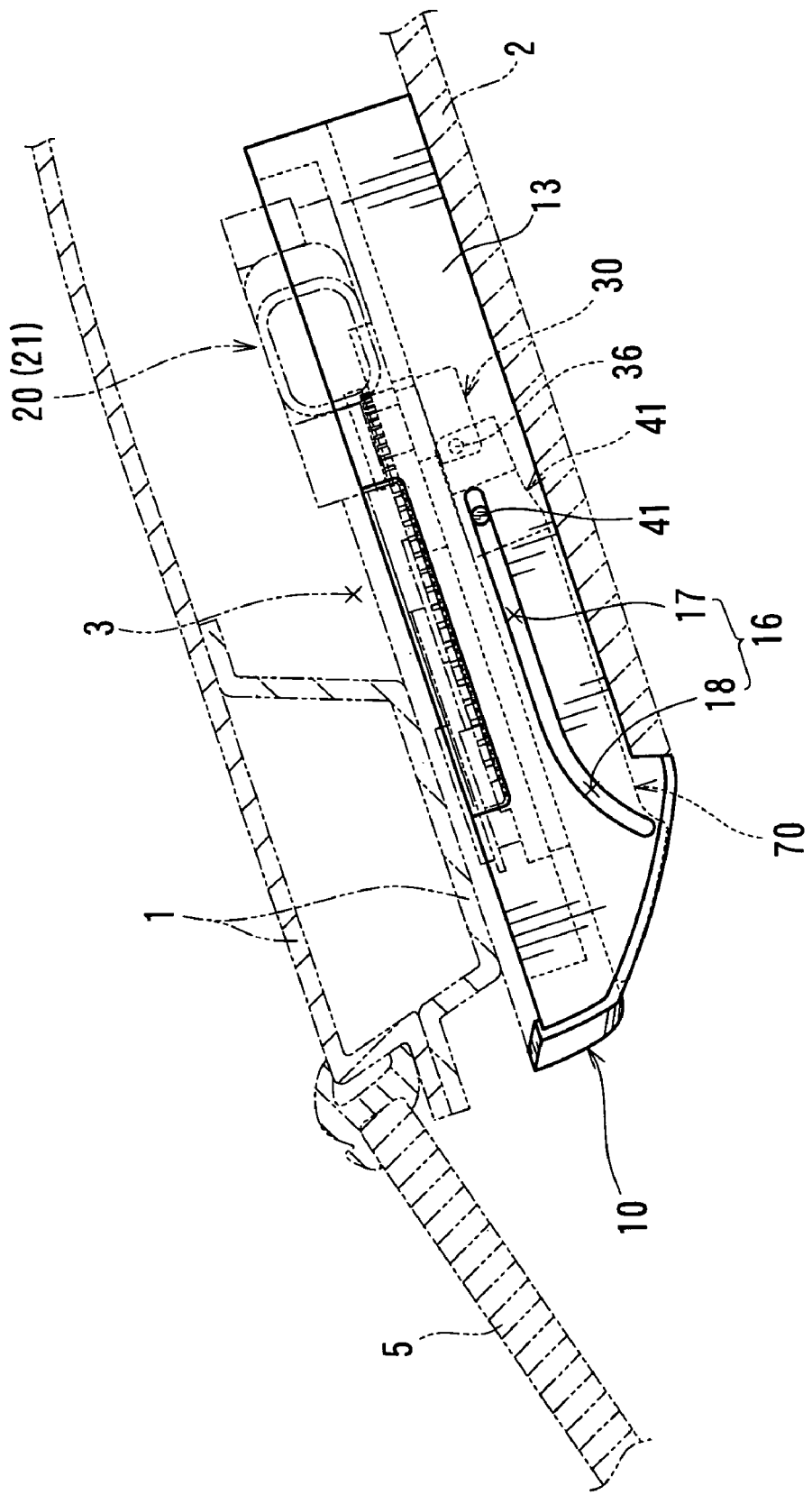
FIG. 12 is right side view of the sun visor shown in FIG. 11.
Figure 13:
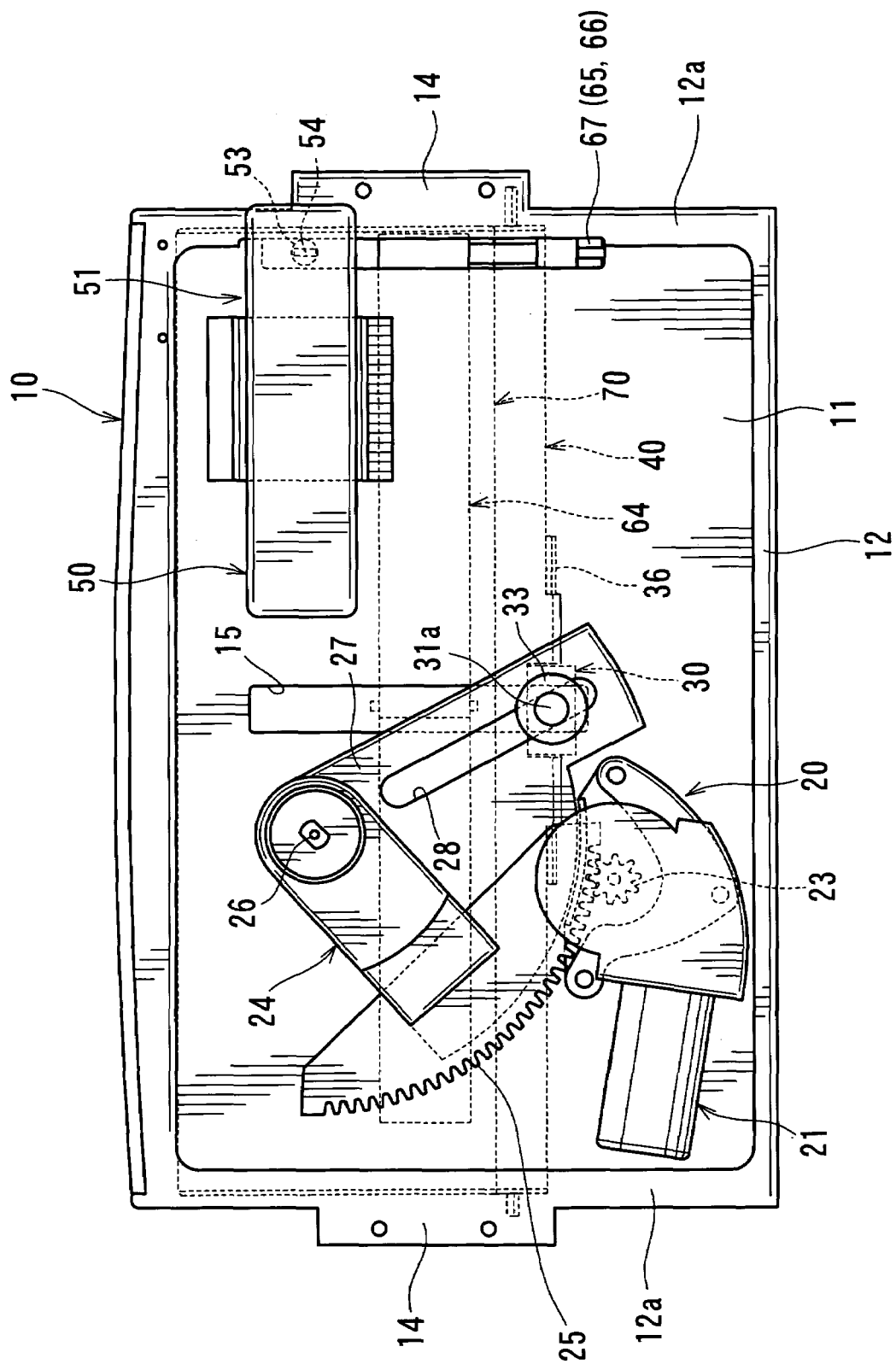
FIG. 13 is a plan view of the sun visor shown in FIG. 11 and showing the relationship between the fixed base and the drive devices with electric motors as drive sources.
Figure 14:
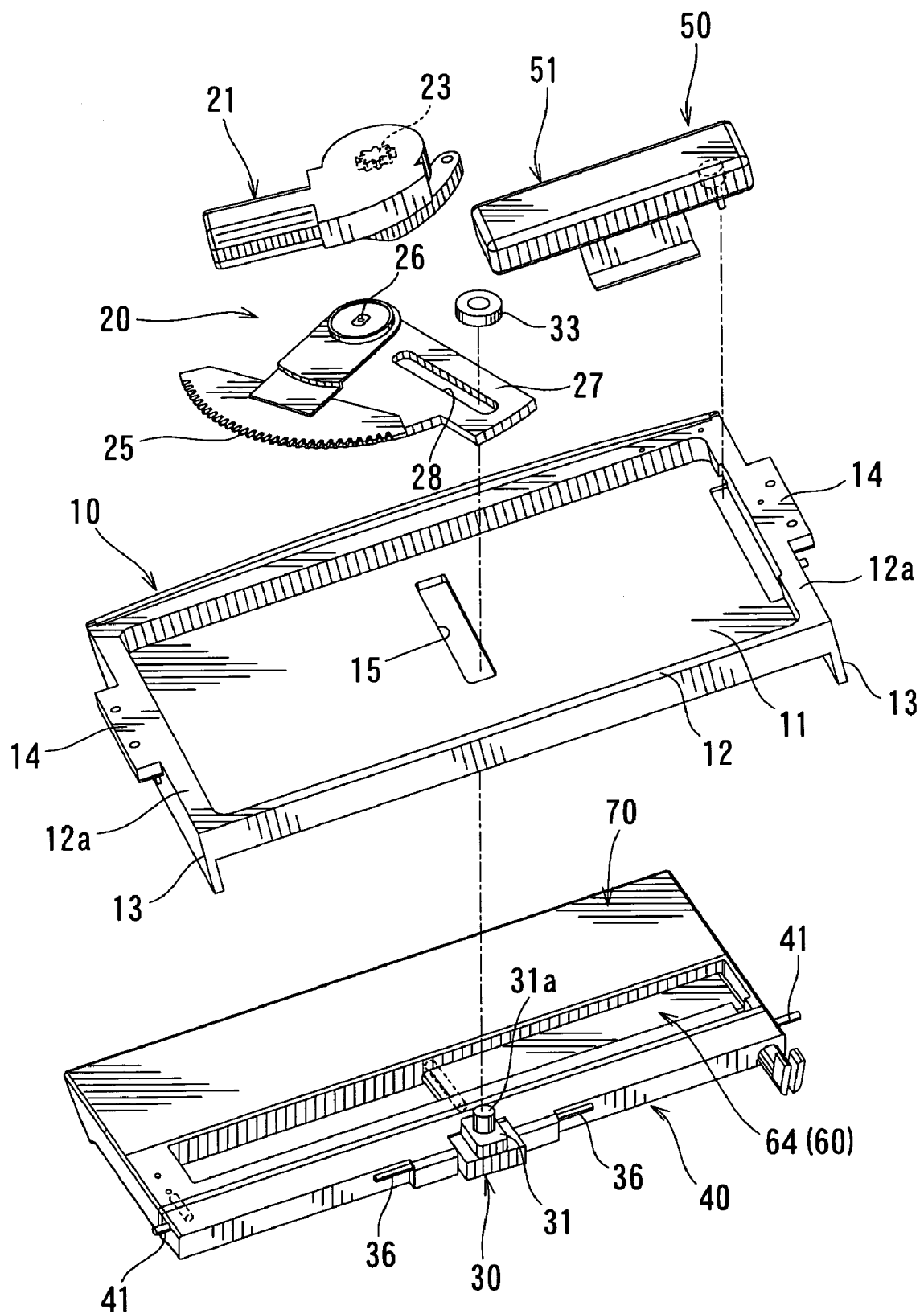
FIG. 14 is an exploded perspective view of the sun visor shown in FIG. 11 and showing in separated form a linearly movable device, a movable support member in addition to the fixed base, the drive devices and the visor body.

The second representative embodiment will now be described with reference to FIGS. 9 and 10. The second representative embodiment is a modification of the first representative embodiment. Therefore, like members are given the same reference numerals as in the first representative embodiment and a description of these members will not be repeated.

The second representative embodiment differs from the first representative embodiment in that the drive device 20, including the electric motor 21 and the actuation member 24, is eliminated. In other respects, the second representative embodiment is the same as the first representative embodiment except that the nut 33 engaging the upper portion of the connecting pin 31a provided on the shaft portion 31 of the linearly movable member 30 is appropriately tightened in order to provide a moderate frictional force between the linearly movable member 30 and the base plate 11 of the fixed base 10. In addition to or alternatively, possible clearances between the shaft portion 31 of the linearly movable member 30 and the linear rail 15 may be set so as to provide a moderate frictional force between the shaft portion 31 and the linear rail 15. With this arrangement, the friction force is not necessary to be applied between the linearly movable member 30 and the base plate 11 by the nut 33. In this case the nut 33 may be omitted.

By providing a moderate frictional force between the base plate 11 of the fixed base 10 and the linearly movable member 30, the operator can manually move the visor body 70 into and out of the storage space 3. This is accomplished by applying an appropriate withdrawing force and an appropriate pushing force to the visor body 70.

In this way, it is possible to easily configure a manually operable sun visor while sharing primary elements with the motorized sun visor, i.e., the fixed base 10, the linearly movable member 30, the movable support member 40, and the visor body 70, for example. By utilizing shared primary elements for both the motorized sun visor and the manually operable sun visor, the overall manufacturing costs of the sun visors can be reduced.

(Third Representative Embodiment)

A third representative embodiment will now be described with reference to FIGS. 11 to 24. This representative embodiment is a modification of the first representative embodiment. Therefore, in FIGS. 11 to 24, like members are given the same reference numeral as in the first representative embodiment and a description of these members may not be repeated.

This representative embodiment differs from the first representative embodiment in that the sun visor includes a drive device 50 with an electric motor 51 in addition to the drive device 20. Therefore, the third representative embodiment will be described primary in connection with the drive device 50.

The drive device 50 is adapted to move the visor body 70 between a light shielding position along the windshield and a light shielding position along one of side windows. Therefore, for the purposes of explanation, the drive device 50 will be hereinafter called the "crosswise drive device 50," and the drive device 20 will be hereinafter called the "lengthwise drive device 20." Similarly, the electric motor 51 of the crosswise drive device 50 will be hereinafter called the "crosswise electric motor 51," and the motor 21 of the lengthwise drive device 20 will be hereinafter called the "lengthwise electric motor 20."

In this representative embodiment, the crosswise drive device 50 is also mounted to the fixed base 10, so that the sun visor is unitized as an assembly of the linearly movable member 30, the movable support 40, the visor body 70, the lengthwise drive device 20, and the crosswise drive device 50, which are mounted to the fixed base 10.

As best shown in FIGS. 20 to 23, a guide mechanism 60 is disposed between the movable support member 40 and the visor body 70 in order to provide guidance for the movement along a predetermined path of the visor body 70 between a front light shielding position and a side light shielding position. The movement of the visor body 70 occurs with one side surface of the visor cover 70 substantially facing the inside of the vehicle cabin. The guide mechanism 60 may include a slide support device 61 and a link arm 64.

Figure 21:
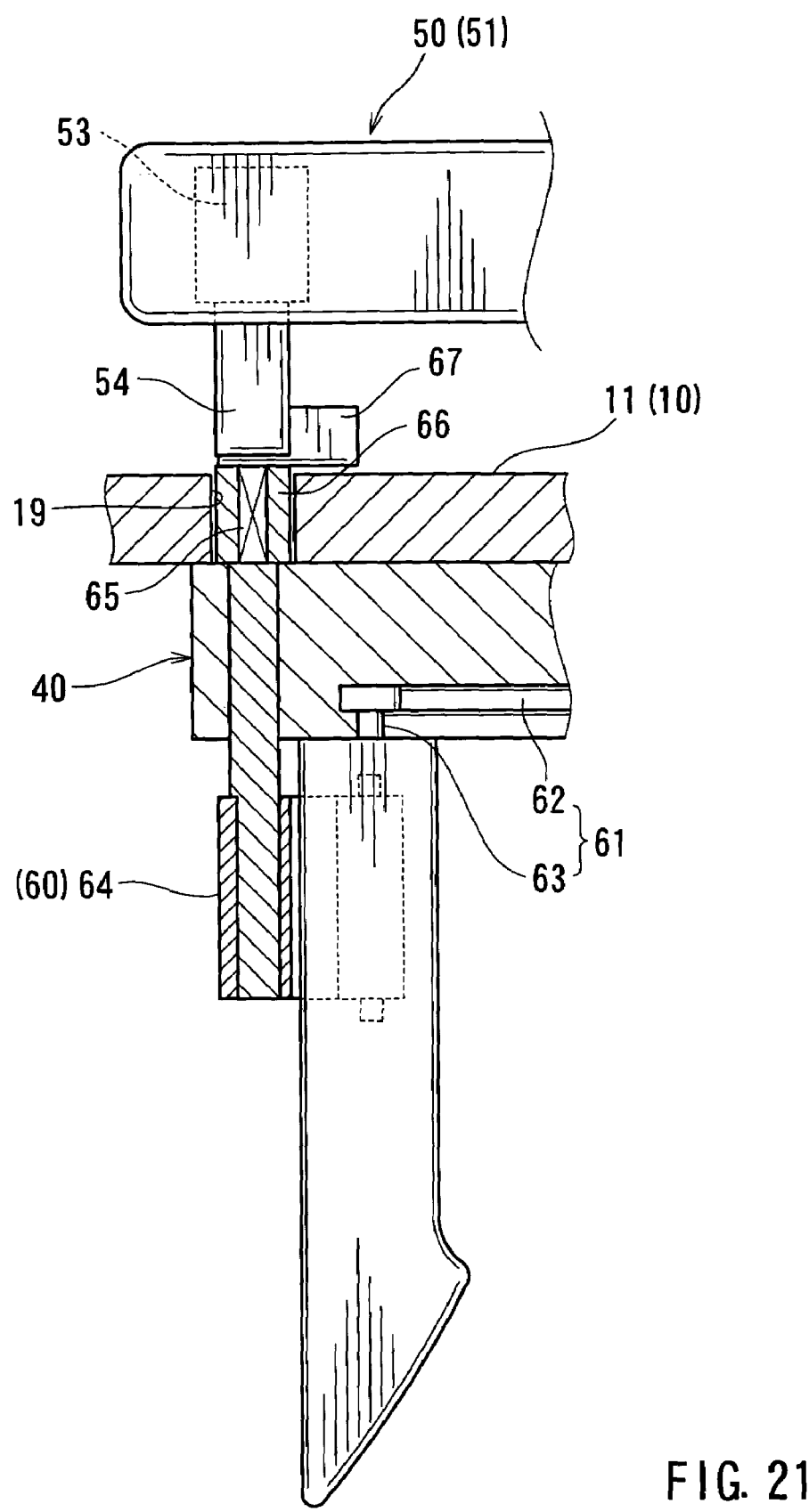
FIG. 21 is a partial cross-sectional view taken along line XXI—XXI in FIG. 20 and showing the connection between the drive shaft and the arm shaft of the link arm.
Figure 22:
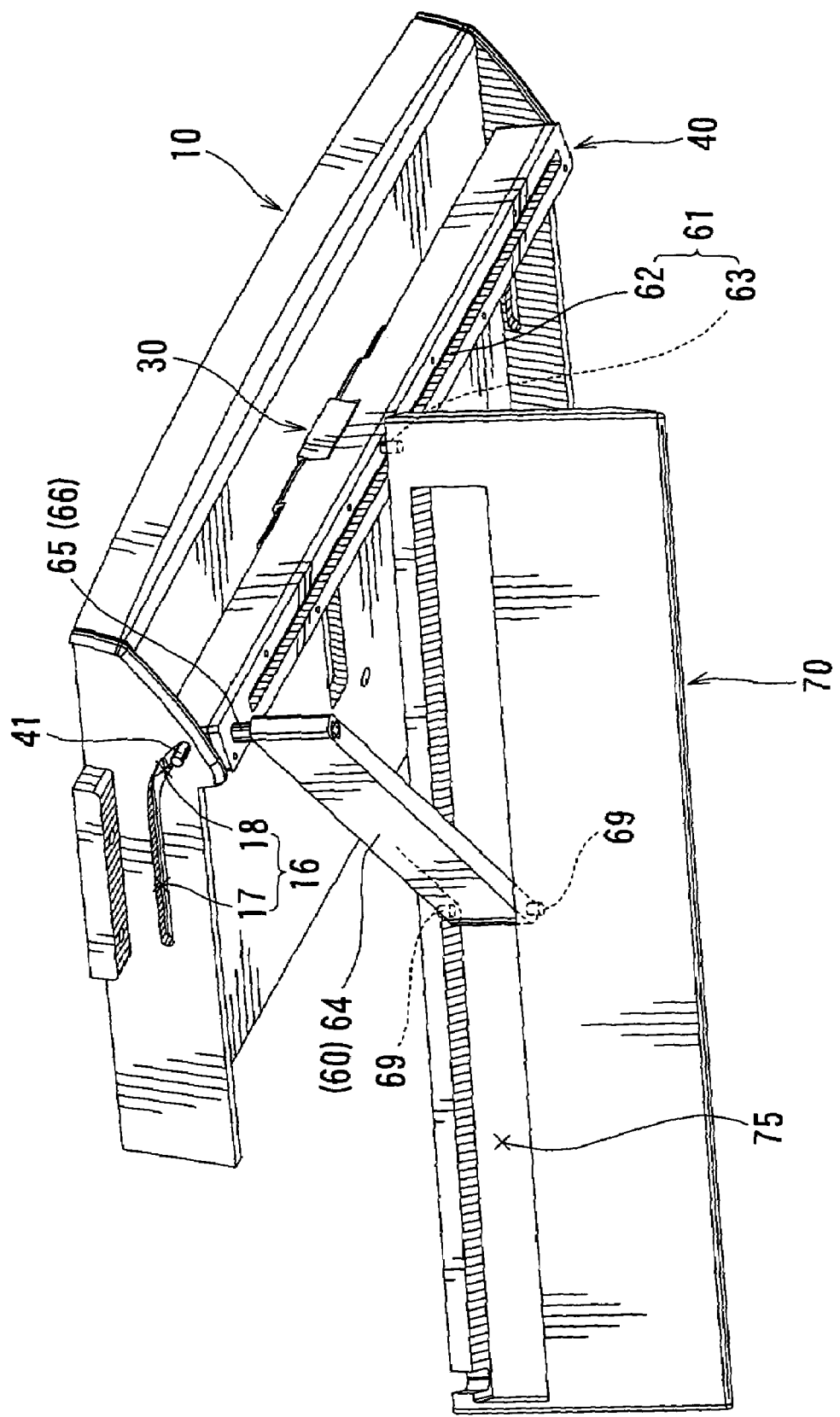
FIG. 22 is a perspective view of the sun visor showing the visor body positioned midway between the front light shielding position and the side light shielding position.

In this configuration, as shown in FIGS. 21 and 22, the movable support member 40 is separated from the visor body 70. A slide groove 62 is formed in an end surface (i.e., the lower end surface as viewed in FIG. 21) of the movable support member 40. This end surface opposes the visor body 70 when the visor body 70 is positioned at or between the storage position and the front light shielding position. The slide groove 62 extends along the longitudinal direction of the movable support member 40. A slide pin 63 is mounted to one end in the longitudinal direction of an end surface (i.e., the upper surface as viewed in FIG. 21) of the visor body 70. The slide pin 63 slidably engages the slide groove 62 so that the slide pin 63 can move along the slide groove 62. The slide groove 62 and the slide pin 63 constitute the slide support device 61.

Figure 23:
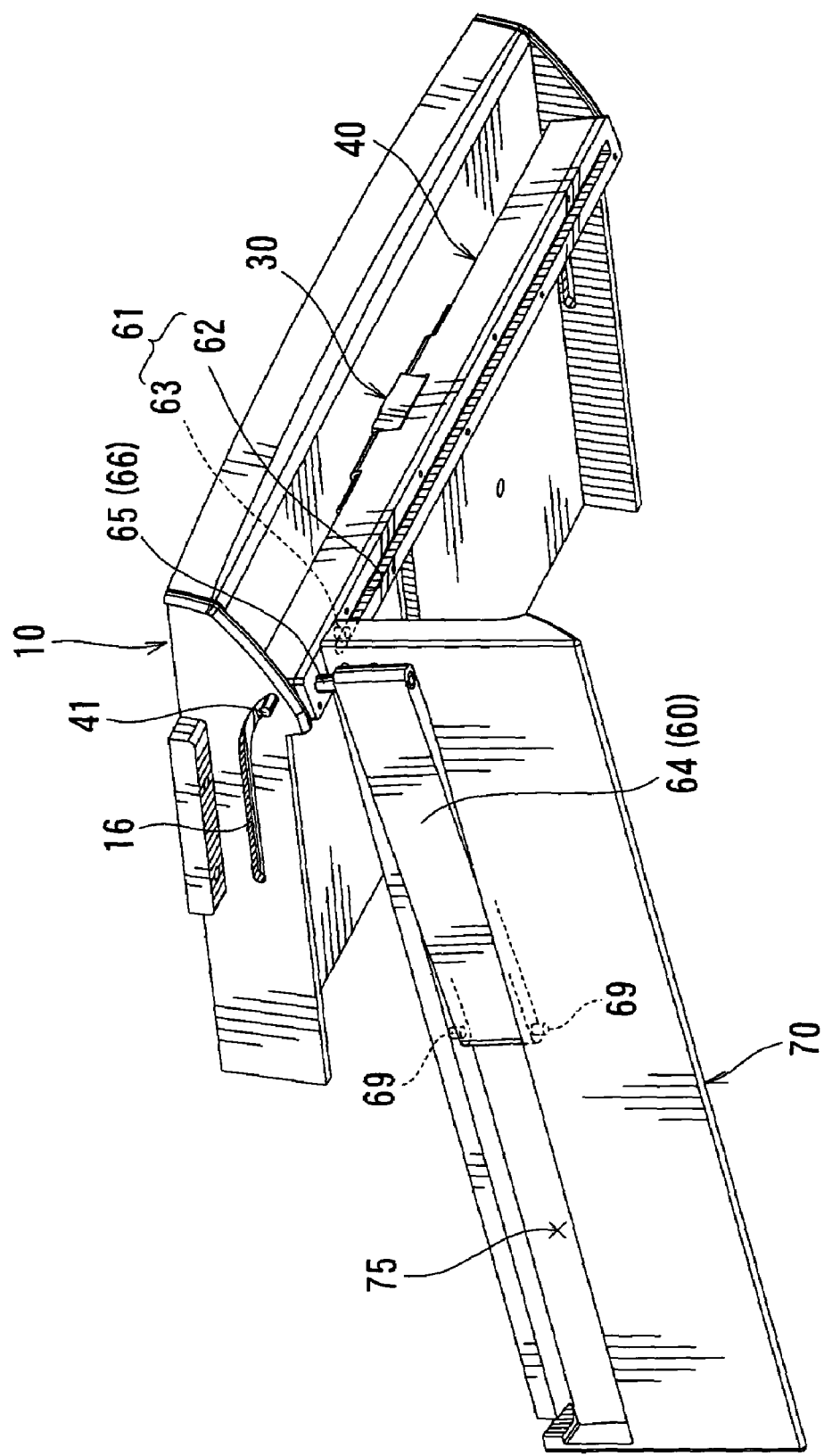
FIG. 23 is a perspective view of the sun visor showing the visor body positioned in the side light shielding position.

As shown in FIGS. 22 and 23, the link arm 64 has a first end that is pivotally supported at one end in the longitudinal direction of the movable support member 40 via an arm shaft 65. The link arm 64 has a second end opposite to the first end. Two pins 69 respectively extend upward and downward from the second end of the link arm 64, as seen in FIGS. 22 and 23. A recess 75 is formed in one of the opposing side surfaces of the visor body 70 and extends along the longitudinal direction of the visor body. The recess 75 is adapted to receive the link arm 64. The pins 69 are respectively pivotally connected to the upper and lower walls of the recess 75 in a substantially central position with respect to the longitudinal direction of the recess 75.

With this arrangement, as the link arm 64 pivots in one direction about the arm shaft 65 when the visor body 70 is initially positioned in the front light shielding position, the visor body 70 may move along a predetermined path from the front light shielding position to a side light shielding position. During this movement, the side surface of the visor body 70 without the recess 75 remains oriented so as to face the interior of the vehicle cabin.

Figure 15:
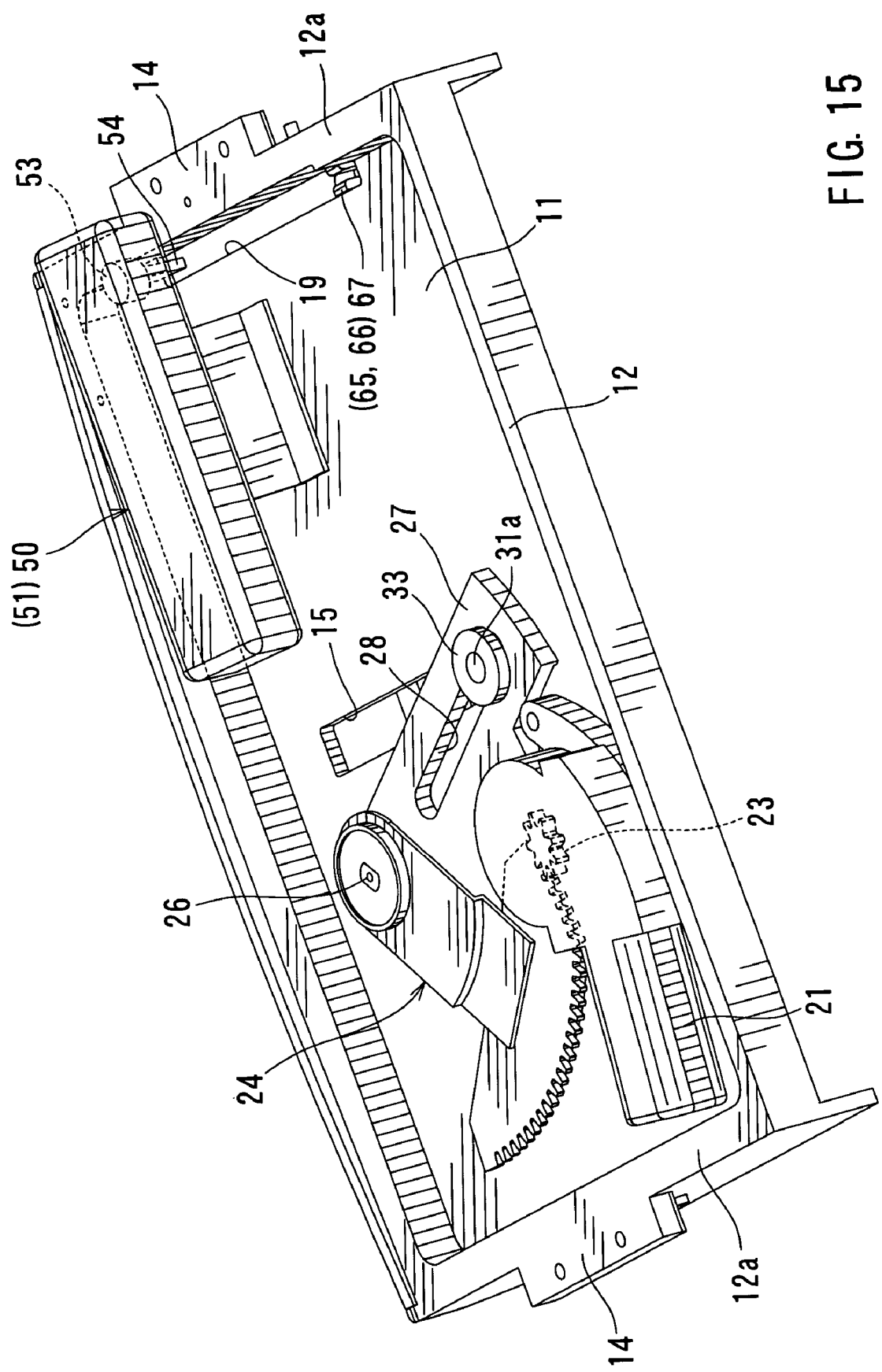
FIG. 15 is a perspective view of the sun visor showing the drive devices mounted to the upper surface of the fixed base.
Figure 16:
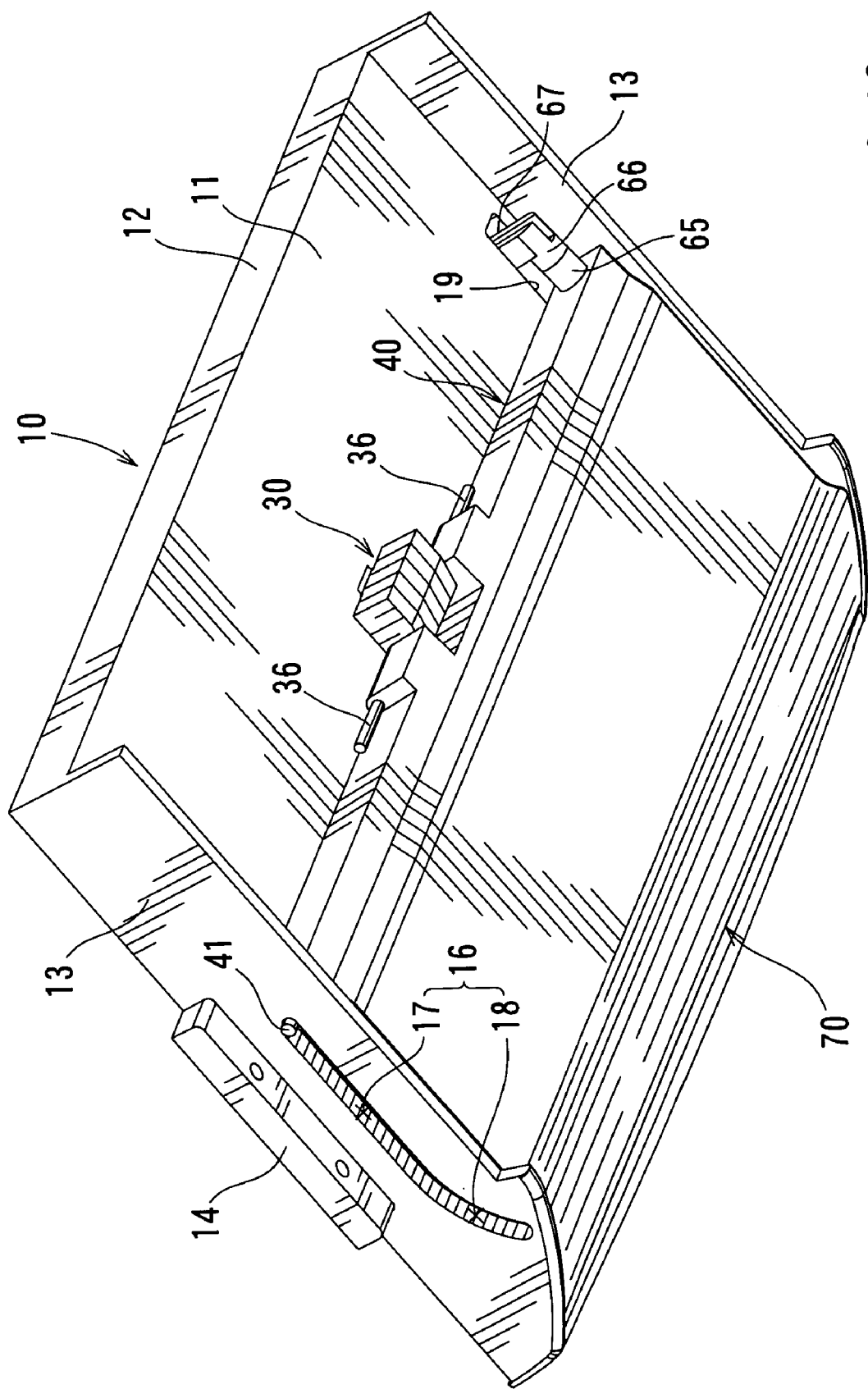
FIG. 16 is a perspective view of the sun visor showing the linearly movable member, movable support member, and the visor body disposed below the fixed base.
Figure 17:
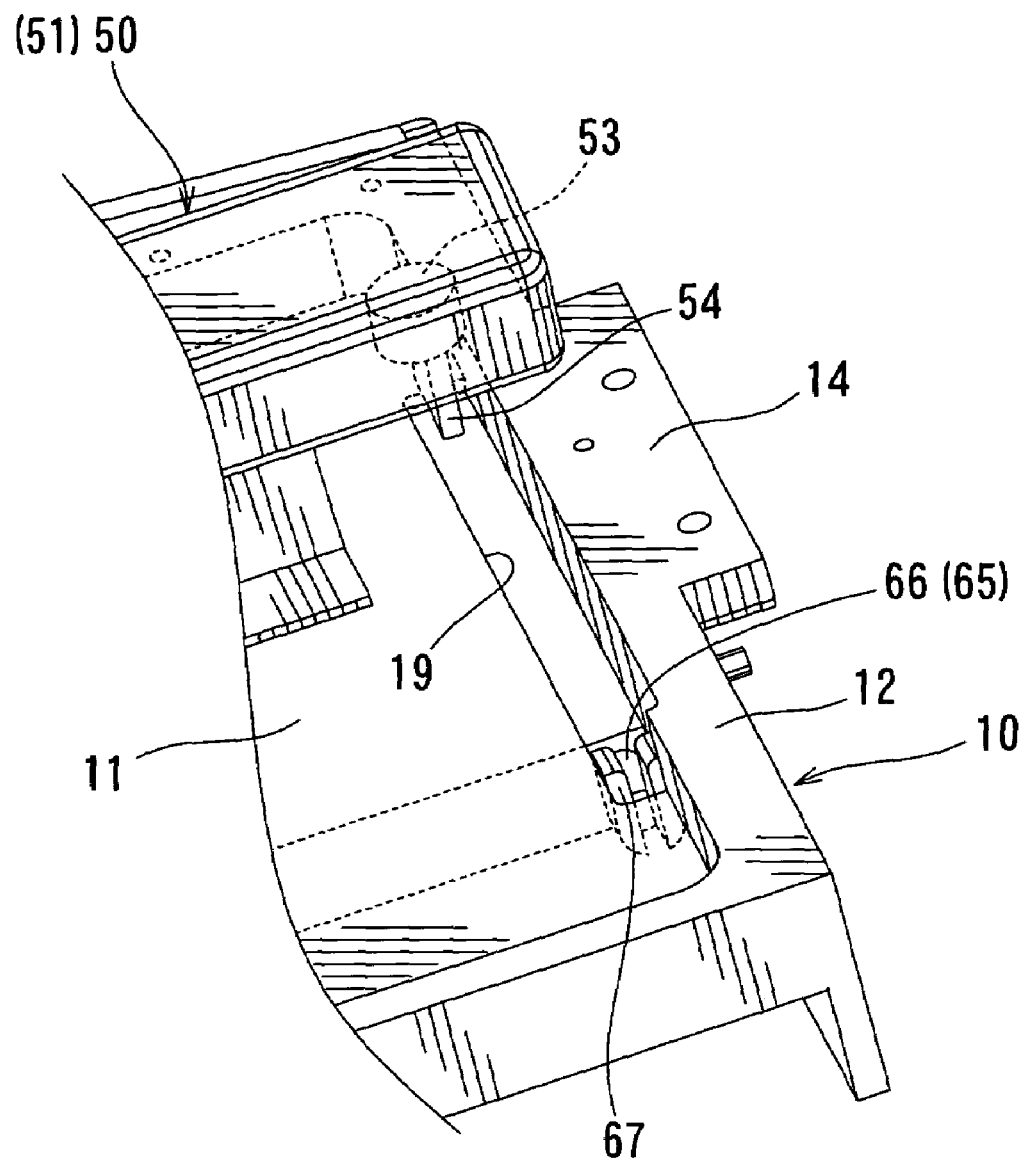
FIG. 17 is a perspective view of a portion of the sun visor and showing the relationship between a drive shaft of one of the drive devices and an arm shaft of a link arm for crosswise movement of the visor body.
Figure 18:
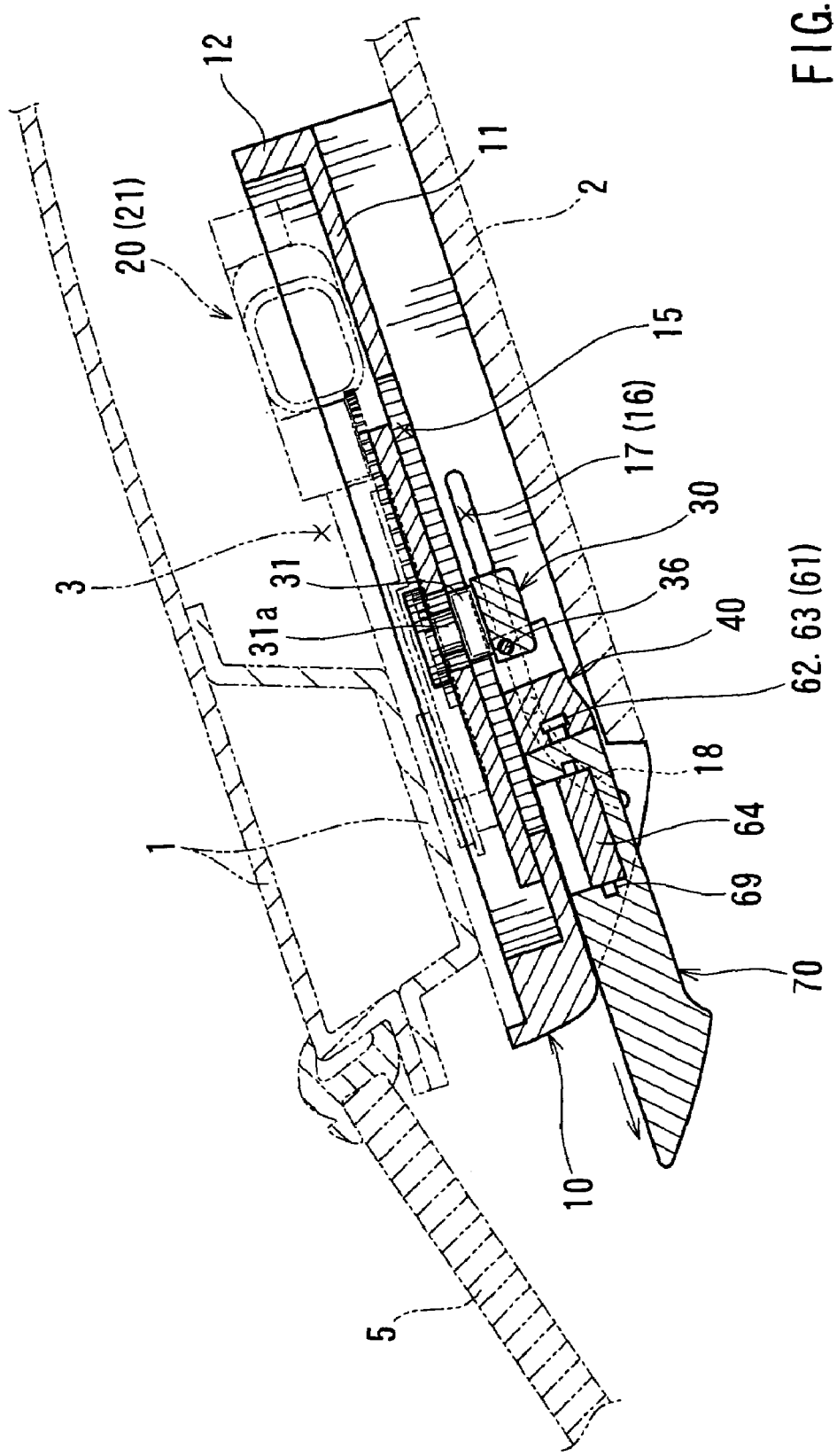
FIG. 18 is a cross-sectional view similar to FIG. 11 but showing the visor body advanced together with the movable support member to a position corresponding to a terminal end of a linear guide portion of a guide rail formed on the fixed base.
Figure 19:
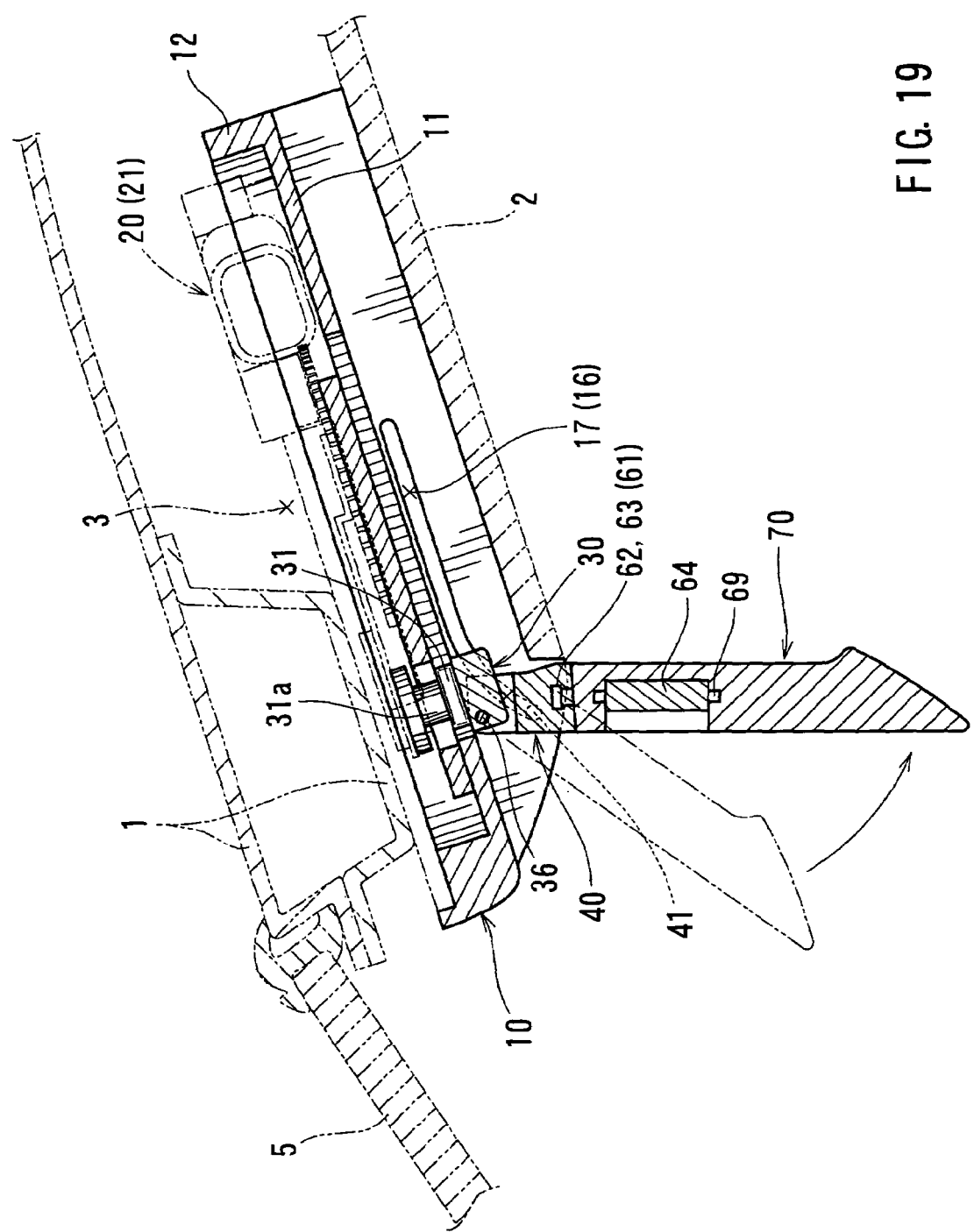
FIG. 19 is a cross-sectional view similar to FIG. 11 but showing the visor body advanced together with the movable support member to a position corresponding to a terminal end of a curved guide portion of the guide rail.
Figure 20:
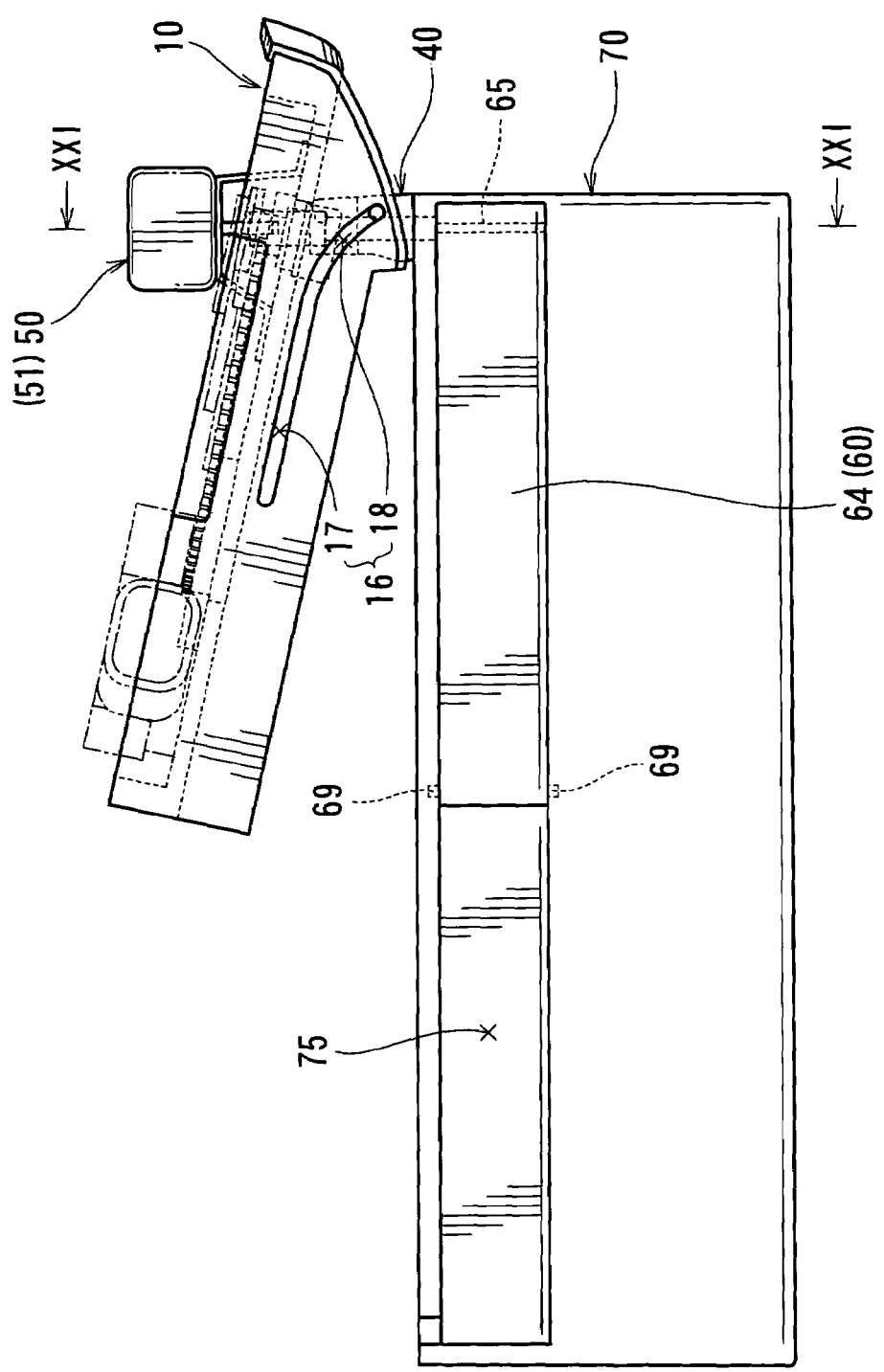
FIG. 20 is an explanatory view showing the visor body in a side light shielding position.

In addition, in this third representative embodiment, the arm shaft 65 can be rotatably driven by the crosswise drive device 50 including the crosswise electric motor 51 as a drive source. As shown in FIGS. 15 to 17, the crosswise electric motor 51 is mounted to the upper surface of the base plate 11 and may have a reduction gear mechanism (not shown). The rotation of the electric motor 51 is consequently reduced and transmitted to a drive shaft 53 (i.e., an output shaft) of the crosswise drive device 50. The drive shaft 53 extends into an elongated slot 19 formed in the base plate 11. The elongated slot 19 is positioned on one side (i.e., the right side as viewed in FIG. 15) of the base plate 11 and extends in a forward and rearward direction (i.e., upward and downward directions as viewed in FIG. 15). An axial end 54 (i.e., a lower end, see FIG. 17 for detail) of the output shaft 53 is flattened or chamfered on both opposing sides, forming for example a flat blade type of extension.

As shown in FIGS. 15 to 17, and FIG. 21, the arm shaft 65 of the link arm 64 extends through an end portion of the movable support member 40 in the vertical direction as viewed in FIG. 21. A joint shaft 66 is formed on the upper end of the arm shaft 65. The joint shaft 66 has a bifurcated end portion 67 extending substantially perpendicular to the axis of the joint shaft 66 or the arm shaft 65.

Therefore, when the visor body 70 is positioned at a front light shielding position as the movable support 40 advances, the bifurcated end portion 67 engages with the flattened axial end 54 of the output shaft 53. The rotation of the drive shaft 53 can then be transmitted to the arm shaft 65 in order to rotate the arm shaft 65 about the same axis as the drive shaft 53.

A switch (not shown) for controlling the crosswise electric motor 51 may be provided. The driver and/or the passenger can operate the switch so as to drive the crosswise electric motor 51 in a forward or a reverse direction or to stop the electric motor 51. Similar to the switch of the lengthwise electric motor 21, the switch of the crosswise electric motor 51 may preferably be mounted at a suitable position of the vehicle, for example such as an instrumental panel, any one of side doors, and the roof lining 2, in order to enable the driver and/or the passenger to easily operate the switch.

The operation of the third representative embodiment will now be described. In the same manner as in the first representative embodiment, the visor body 70 may move between a storage position within the storage space 3 and the front light shielding position outside of the storage space 3. This movement may occur as the driver or the passenger operates the switch of the lengthwise electric motor 21.

When the visor body 70 has moved to the storage position within the storage space 3, the bifurcated portion 67 of the joint shaft 66, which is connected to the link arm 64 via the joint shaft 66 and the arm shaft 65, may be positioned away from the axial end 54 of the drive shaft 53 of the crosswise electric motor 51. In this position the bifurcated portion 67 is disengaged from the axial end 54 of the drive shaft 53 (see FIG. 17).

When the visor body 70 has moved to the front light shielding position, the bifurcated portion 67 of the joint shaft 66 may be brought so as to engage the axial end 54 of the drive shaft 53. Therefore, the rotation of the drive shaft 53 of the crosswise electric motor 51 may be transmitted to the arm shaft 65 of the link arm 64 in order to rotate the arm shaft 65 about the same axis as the drive shaft 53 (see FIG. 21).

In order to move the visor body 70 from the front light shielding position to the side light shielding position shown in FIG. 23, the driver or the passenger may operate the switch to rotate the crosswise electric motor 51 in one direction. The rotation of the drive shaft 53 may then be transmitted to the arm shaft 65 to pivot the link arm 64 about the arm shaft 65 towards the side window.

As the link arm 64 pivots, the visor body 70 pivots relative to the link arm 64 about the pins 69 of the link arm 64, as shown in FIG. 22. At the same time, the slide pin 63 at one end of the visor body 70 moves along the slide groove 62 formed in the movable support member 40. In this way, the visor body 70 may move towards a side light shielding position. A sensor (not shown) may detect when the visor body 70 has completely moved to the side light shielding position. The crosswise electric motor 51 may be stopped based upon the detected signal of the sensor. Alternatively, the driver or the passenger may stop the crosswise electric motor 51 by the manual operation of the switch (e.g., by releasing the switch for example). Therefore, the visor body 70 may be stopped at the side light shielding position as shown in FIG. 23. The side light shielding position of the visor body 70 may be maintained through the engagement between the bifurcated portion 67 of the joint shaft 66 and the axial end 54 of the drive shaft 53 that is held in a rotational position.

As described above, the visor body 70 may move from the front light shielding position to the side light shielding position along a predetermined path while one side surface of the visor body 70 without the recess 75 faces to the interior of the vehicle cabin. Therefore, the driver or the passenger may not be required to move their head away from the path of the visor body 70 during the movement of the visor body 70.

In order to move the visor body 70 from a side light shielding position to the front light shielding position, the driver or the passenger may operate the switch in order to rotate the crosswise electric motor 51 in a reverse direction. The visor body 70 may then move in the opposite direction to the front light shielding position along the predetermined path.

With this configuration, according to the third representative embodiment, the visor body 70 can move between a storage position and the front light shielding position as the linearly movable member 30 is moved forward and rearward by the lengthwise drive device 20 having the lengthwise electric motor 21 as a drive source. In addition, the visor body 70 can move between a front light shielding position and the side light shielding position as the link arm 64 is pivoted about the axis of the arm shaft 65 by the crosswise drive device 50 having the crosswise electric motor 51 as a drive source.

In addition, both the lengthwise electric motor 21 and the crosswise electric motor 51 are fixedly mounted to the fixed base 10. Initially, the drive shaft 53 driven by the crosswise electric motor 51 and the bifurcated end 67 of the joint shaft 66 of the arm shaft 65 are positioned away from each other so as to be disconnected when the visor body 70 is stored within the storage space 3 (i.e., until the visor body reaches a front light shielding position). The drive shaft 53 and the bifurcated end 67 are engaged with each other so as to be connected with regard to rotation when the visor body 70 is positioned in a front light shielding position.

Because the electric motors 21 and 51 are fixedly mounted to the same fixed base 10, necessary electrical wiring from the power source to the lengthwise electric motor 21 and the crosswise electric motor 51 can be readily facilitated.

However, in a configuration where the crosswise electric motor 51 is mounted to the movable support member 40, it is difficult to ensure enough space around the movable support member 40 for positioning the crosswise electric motor 51. In addition, a troublesome and complex wiring arrangement is required for the crosswise electric motor 51 because the crosswise electric motor 51 may move together with the movable support member 40. The arrangement of the third representative embodiment is not presented with these problems.

(Fourth Representative Embodiment)

Figure 24:
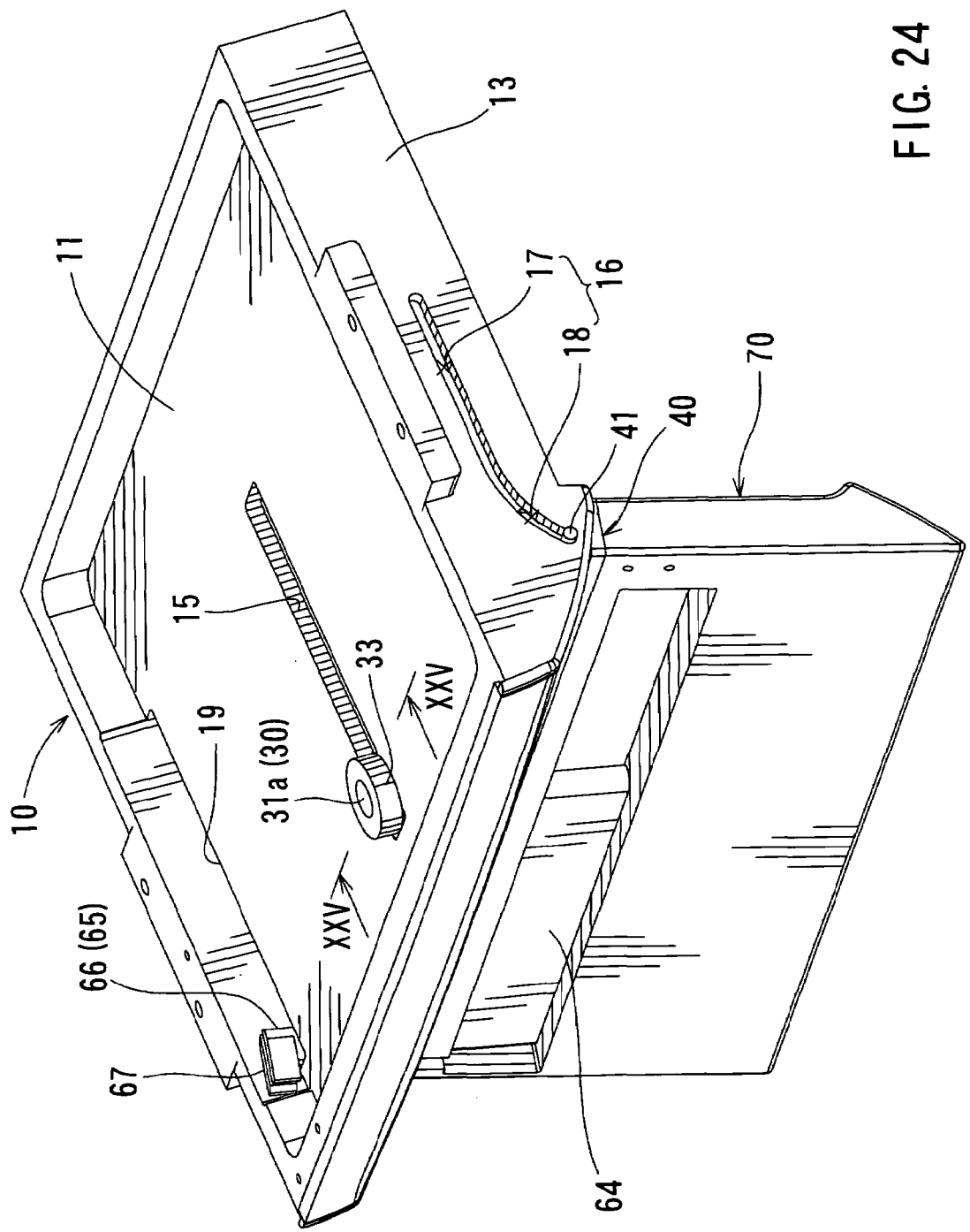
FIG. 24 is a perspective view of a sun visor according to a fourth representative embodiment and showing the relationship between a fixed base and a linearly movable member.
Figure 25:
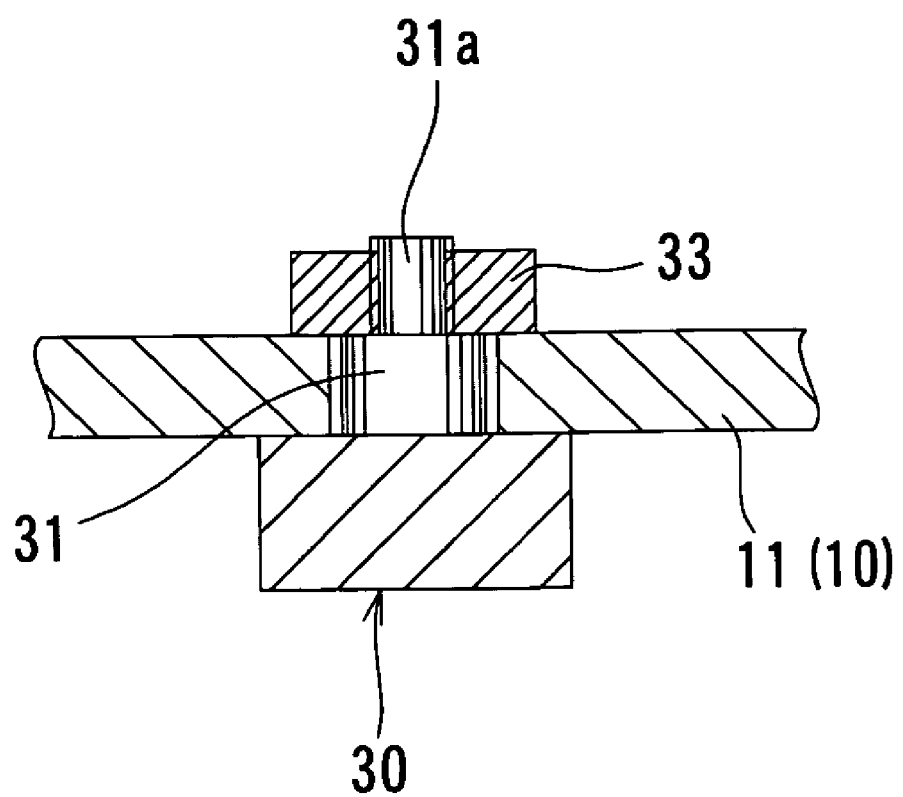
FIG. 25 is a partial cross-sectional view taken along line XXV—XXV in FIG. 24.

A fourth representative embodiment will now be described in connection with FIGS. 24 and 25. The fourth representative embodiment differs from the third representative embodiment in that the lengthwise drive device 20 including the lengthwise electric motor 21 and the crosswise drive device 50 including the crosswise electric motor 51 are eliminated. Alternatively, the driver and/or passenger may manually move the visor body 70 between a storage position and the front light shielding position and between a front light shielding position and the side light shielding position. In other respects, the fourth representative embodiment is the same as the third representative embodiment except that the nut 33 engaging the upper portion of the connecting pin 31a provided on the shaft portion 31 of the linearly movable member 30 is appropriately tightened to provide a moderate frictional force between the linearly movable member 30 and the base plate 11 of the fixed base 10 (see FIG. 25). This moderate frictional force is applied in the same manner as described with reference to FIGS. 9 and 10 in connection with the second representative embodiment.

By providing a moderate frictional force between the base plate 11 of the fixed base 10 and the linearly movable member 30, the operator can manually move the visor body 70 into and out of the storage space 3. The movement of the visor body 70 occurs as a result of the operator applying an appropriate withdrawing force and an appropriate pushing force to the visor body 70.

In addition, the operator can manually move the visor body 70 from a front light shielding position to the side light shielding position along a predetermined path. The movement of the visor body occurs while one side of the visor body 70 faces the interior of the vehicle. In order to move the visor body 70 in this manner, the operator applies an appropriate force to move the slide pin 63 at one end of the visor body 70 along the slide groove 62 of the movable support member 40 so as to pivot the link arm 64 about the arm shaft 65. The operator can also manually move the visor body 70 from the side light shielding position to the front light shielding position by applying a force to the visor body 70 to move the same in the opposite direction along the predetermined path.

Also in this representative embodiment, it is possible to easily configure the manually operable sun visor while sharing many primary elements of the motorized sun visor, i.e., the fixed base 10, the linearly movable member 30, the movable support member 40, the link arm 64, and the visor body 70. By utilizing the primary elements shared for both the motorized sun visor and the manually operable sun visor, the overall manufacturing costs of the sun visors can be reduced.

(Fifth Representative Embodiment)

A fifth representative embodiment will now be described with reference to FIG. 26. This representative embodiment is a modification of the third representative embodiment and differs from the third representative embodiment in that a crosswise electric motor 151 is fixedly mounted to the vehicle ceiling (not shown in FIG. 26) in order to move the slide pin 63 disposed at one end of the visor body 70 along the slide groove 62. As the slide pin 63 slides along the slide groove 62, the link arm 64 may pivot about the arm shaft 65. The visor body 70 may then move between a front light shielding position and the side light shielding position along a predetermined path while one side of the visor body faces the interior of the vehicle cabin.

Figure 26:
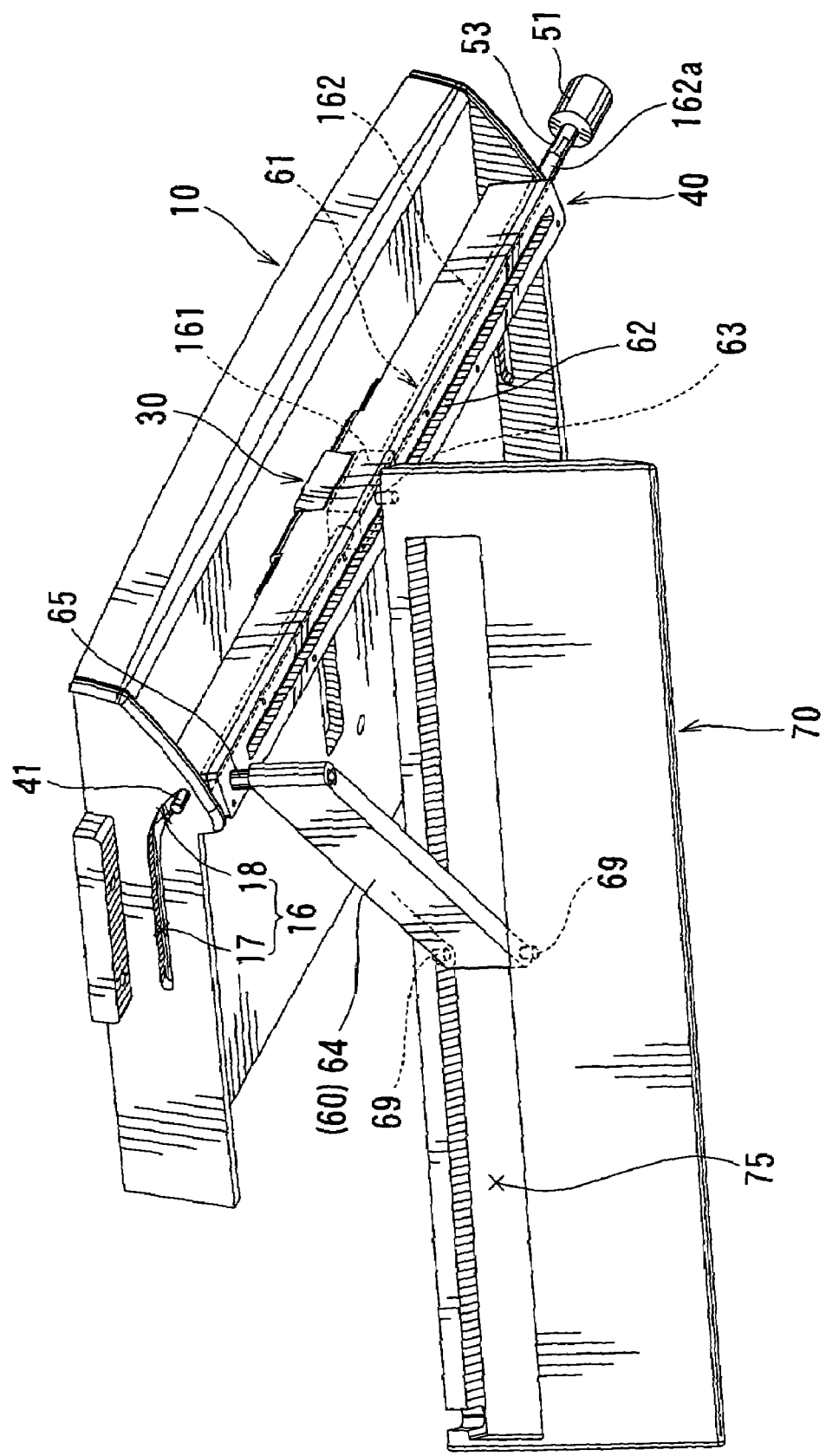
FIG. 26 is a perspective view of a sun visor according to a fifth representative embodiment and showing the relationship between a movable support member and a slide support of a visor body.
Figure 27:
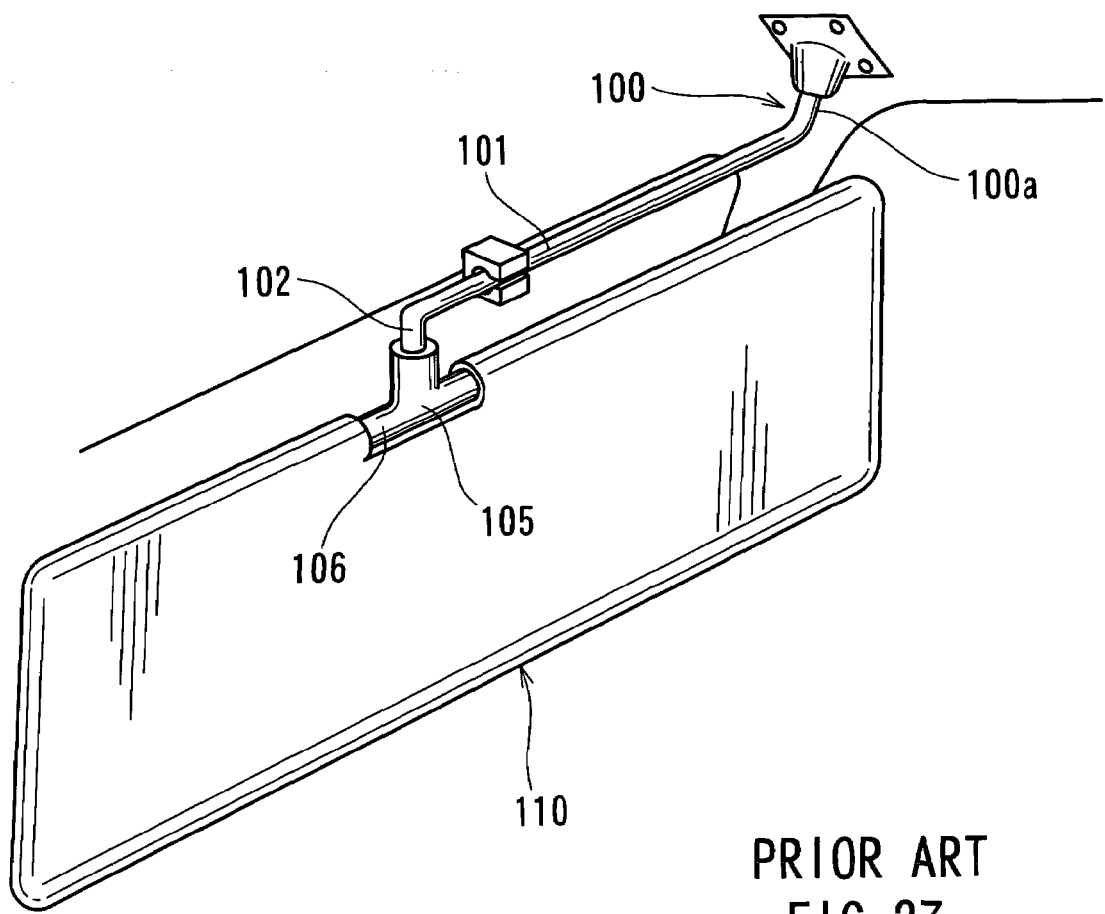
FIG. 27 is a schematic view of a known vehicle sun visor.

Referring to FIG. 26, a ball screw 162 is rotatably disposed within the movable support member 40. The ball screw 162 extends along the length of the movable support member 40. A slide block (i.e., threaded nut) 161 engages with the ball screw 162 and is slidably movable within the movable member 40 along the length of the movable member 40. The slide pin 62 of the slide support device 61 is mounted to the slide block 161 and extends from the slide block 161 so as to be pivotally joined to the visor body 70. One axial end 162a of the ball screw 162 extends outside of the movable support member 40 so that the axial end 162a engages with a drive shaft 153 of the crosswise electric motor 151. The drive shaft 153 engages the axial end 162a when the visor body 70 is in a front light shielding position. In other respects, the fifth representative embodiment is the same as the third representative embodiment.

When the visor body 70 is stored within the storage space 3 (not shown in FIG. 26), the axial end 162a of the ball screw 162 is positioned away from the drive shaft 153 of the crosswise drive motor 151, so as to be disconnected from the drive shaft 153 with respect to rotation. When the visor body 70 reaches the front light shielding position, the axial end 162a of the ball screw 162 is engaged with the drive shaft 153 of the crosswise drive motor 151 so as to be connected therewith with regard to rotation. As a result, the rotation of the crosswise drive motor 151 is transmitted to the ball screw 162, so that the slide pin 62 moves together with the slide block 161 along the length of the ball screw 162 as the ball screw 162 rotates.

(Other Possible Embodiments)

The third to fifth representative embodiments have been described in connection with a sun visor in which the visor body 70 moves together with the movable support member 40 into and out of the storage space 3 defined in the vehicle cabin ceiling. However, it is possible to modify the third to fifth representative embodiments such that the movable support member 40 simply rotates about a horizontal rod. This rotation would be in order to move the visor body 70 between a storage position along the vehicle cabin ceiling and a front light shielding position along the windshield, while the visor body 70 is being exposed to the area outside of the vehicle cabin ceiling.

In such a case, the movable support member 40 may be manually rotated or may be rotatably driven by a drive motor corresponding to the lengthwise drive motor 21. Similarly, the arm shaft 65 of the link arm 64 may be manually rotated or may be rotatably driven directly or indirectly by the crosswise electric motor 51 (151).

Furthermore, both the lengthwise electric motor and the crosswise electric motor may be fixedly mounted to the vehicle cabin ceiling.

The invention claimed is:

1. A vehicle sun visor comprising:

a visor body, and a fixed base mounted within a storage space defined in a vehicle cabin ceiling, a first guide rail provided on the fixed base and extending linearly in a forward direction and a rearward direction; and a second guide rail provided on the fixed base and including:

a first rail portion extending linearly in a direction substantially parallel to a surface of the fixed base, and a second rail portion formed in series with the first guide rail and extending along a curved path, and a linearly movable member movable along the first guide rail, and a movable support member movable along the second guide rail and coupled to the linearly movable member so as to pivot about an axis substantially perpendicular to the first guide rail, wherein the visor body is mounted to the movable support member, so that an angular orientation of the visor body gradually changes from a first position corresponding to a storage position within the storage space, to a second position correspond a light shielding position, as the movable support member moves along the second guide rail from the first rail portion to the second rail portion.

2. The vehicle sun visor as in claim 1, wherein the visor body in the first position extends substantially along the vehicle cabin ceiling, and wherein the visor body in the second position extends substantially along a windshield.

3. The vehicle sun visor as in claim 1, wherein the fixed base comprises a base plate, and a right side wall and a left side wall formed integrally with the base plate and respectively disposed on a right side and a left side of the base plate, and wherein the first guide rail is provided with the base plate, and wherein the second guide rail is provided with each of the right and left side walls.

4. The vehicle sun visor as in claim 1, further comprising a drive device having an electric motor as a drive source, wherein the drive device is coupled to the linearly movable member so that the linearly movable member is moved along the first guide rail by the drive device.

5. A vehicle sun visor comprising:

a base, and a visor body, and a visor support attached to the visor body;

wherein the visor support has a first member movable relative to the base along a first path and a second member attached to the visor body and movable relative to the base along a second path, so that an angular orientation of the visor body relative to the base changes as the visor support moves between a first position and a second position respectively corresponding to a storage position and a light shielding position of the visor body;

wherein the first path extends linearly within a first plane; and wherein the second path has a linear path portion extending linearly within a second plane, and a curved path portion extending in series with the linear path portion and curved within a plane substantially perpendicular to the second plane, so that the second member moves along the linear path portion and the curved path portion as the visor support moves from the first position to the second position;

wherein both a relative angle of the visor body to the base and a position of the visor body in a direction perpendicular to the second plane relative to the base change as the second member moves along the curved path portion of the second path.

6. The vehicle sun visor as in claim 5, further including a frictional device disposed between the base and the first member of the visor support for applying a suitable frictional resistance against movement of the first member along the first path of the base.

7. The vehicle sun visor as in claim 6 wherein the frictional device comprises a tightening device for tightening the first member against the base by a suitable tightening force.

8. The vehicle sun visor as in claim 7, wherein the first path comprises a first slot formed in the base;

wherein the tightening device comprises a threaded shaft portion and a nut;

wherein the threaded shaft portion protrudes from the first member and extending through the first slot; and wherein the nut engages the threaded shaft portion, so that the first member is tightened against the base as the nut is fastened.

9. The vehicle sun visor as in claim 5, wherein the first member is pivotally connected to the second member.

10. The vehicle sun visor as in claim 9, wherein the base has a base plate comprising:

a first vertical wall formed on a surface of the base plate, and a second vertical wall formed on the surface of the base plate, and wherein the first vertical wall is parallel to the second vertical wall, wherein the first path is defined by a first slot formed in the base plate, and wherein the second path is defined by corresponding second slots respectively formed in the first vertical wall and the second vertical wall.

11. The vehicle sun visor as in claim 5, further comprising a drive device coupled to the first member for moving the visor support between the first position and the second position.

12. A vehicle sun visor comprising:

a visor body having a longitudinal length, a first longitudinal end, and a second longitudinal end;

a visor support including a support member and a guide device, wherein the visor body is connected to the support member via the guide device;

wherein the guide device directs movement of the first longitudinal end of the visor body along a predetermined path between a longitudinal position of the support member and a second longitudinal position of the support member;

wherein the first longitudinal position of the support member corresponds to the visor body being oriented in a first light shielding position along a windshield;

wherein the second longitudinal position corresponds to the visor body being oriented in a second light shielding position along a side window;

wherein the support member has a longitudinal direction, and wherein the guide device comprises:

a slide support connected to the first longitudinal end of the visor body so as to permit the first longitudinal end of the visor body to pivotally slide in the longitudinal direction of the support member, and a link arm comprising:

a first link end pivotally supported by the movable support member via a vertical arm shaft; and a second link end opposite to the first end and pivotally connected to a portion of the visor body located substantially equidistant from the first longitudinal end and the second longitudinal end;

wherein the slide support moves along the predetermined path as the first longitudinal end of the visor body moves between the first longitudinal position and the second longitudinal position; and wherein the link arm pivots about an axis of the vertical arm shaft as the first longitudinal end of the visor body moves between the first longitudinal position and the second longitudinal position.

13. The vehicle sun visor as in claim 12, further comprising:

a first drive device comprising a first drive source, and a second drive device comprising a second drive source, wherein the first drive source and the second drive source are electric motors, and wherein the first drive device generates forces upon the support member so as to move the visor body between the first light shielding position and a storage position along a vehicle cabin ceiling, and wherein the second drive device generates forces upon one of the link arm or the slide support so as to move the first longitudinal end of the visor body between the first longitudinal position and the second longitudinal position.

14. The vehicle sun visor as in claim 13, wherein the first drive source of the first drive device is fixed in position relative to the vehicle cabin ceiling, and wherein the second drive source of the second drive device is fixed in position relative to the vehicle cabin ceiling, and wherein the one of the link arm or the slide support is disconnected from the second drive device when the visor body is in the storage position and wherein the one of the link arm or the slide support is connected to the second drive device so as to be driven by the second drive device when the visor body is in the first light shielding position.

15. A vehicle sun visor comprising:

a visor body having a first longitudinal end and a second longitudinal end; and a visor support comprising a support member and a link mechanism provided between the support member and the visor body in order to permit movement of the visor body between a first light shielding position and a second light shielding position;

wherein the link mechanism comprises a link arm and a slide support;

wherein the link arm has a first link end pivotally mounted to the support member and a second link end pivotally mounted to the visor body; and wherein the slide support pivotally and slidably connects the first longitudinal end of the visor body to the support member, so that the first link end and the second link end of the link arm and the slide support correspond to apexes of a triangle with a variable distance between the first link end of the link arm and the slide support.

16. The vehicle sun visor as in claim 15, wherein the support member and the visor body are positioned substantially parallel to each other when the visor body is in the first light shielding position, and wherein the support member and the visor body are inclined relative to each other when the visor body is in the second light shielding position.

17. The vehicle sun visor as in claim 16, wherein the support member has a first support longitudinal end and a second support longitudinal end;

wherein the first end of the link arm is pivotally connected to the first support longitudinal end of the support member; and wherein the second end of the link is pivotally connected to a the visor body at a point that is substantially equidistant from the first longitudinal end and the second longitudinal end.

18. The vehicle sun visor as in claim 15, further comprising:

a base attachable to a vehicle cabin ceiling, and wherein the support member is mounted on the base and is movable relative to the base so that the visor body moves between the first light shielding position and a storage position along the vehicle cabin ceiling.

19. The vehicle sun visor as in claim 18, further comprising a drive device coupled to the support member and to one of the link arm or the slide support.

20. The vehicle sun visor as in claim 19, wherein the drive device comprises a first drive device and a second drive device fixedly mounted to the base, and wherein the first drive device is coupled to the support member in order to move the visor body between the storage position and the first light shielding position, and wherein the second drive device is coupled to the one of the link arm or the slide support to move the visor body between the first light shielding position and the second light shielding position.

* * * * *